US012206860B2

(12) United States Patent
Esenlik et al.

(10) Patent No.: US 12,206,860 B2
(45) Date of Patent: Jan. 21, 2025

(54) EARLY TERMINATION FOR OPTICAL FLOW REFINEMENT

(71) Applicant: HUAWEI TECHNOLOGIES CO., LTD., Guangdong (CN)

(72) Inventors: Semih Esenlik, Munich (DE); Sriram Sethuraman, Bangalore (IN); Jeeva Raj A, Rasipuram (IN); Sagar Kotecha, Mangal Karyalaya (IN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 18/592,849

(22) Filed: Mar. 1, 2024

(65) Prior Publication Data

US 2024/0283938 A1  Aug. 22, 2024

Related U.S. Application Data

(63) Continuation of application No. 17/407,617, filed on Aug. 20, 2021, now Pat. No. 11,985,320, which is a
(Continued)

(30) Foreign Application Priority Data

Feb. 22, 2019  (IN) .............................. 201931007114

(51) Int. Cl.
*H04N 19/132* (2014.01)
*H04N 19/117* (2014.01)
(Continued)

(52) U.S. Cl.
CPC ......... *H04N 19/132* (2014.11); *H04N 19/117* (2014.11); *H04N 19/159* (2014.11); *H04N 19/176* (2014.11); *H04N 19/82* (2014.11)

(58) Field of Classification Search
CPC .. H04N 19/176; H04N 19/577; H04N 19/132; H04N 19/105; H04N 19/139;
(Continued)

(56) References Cited

U.S. PATENT DOCUMENTS

2004/0076333 A1  4/2004 Zhang et al.
2016/0301848 A1  10/2016 Taggart et al.
(Continued)

FOREIGN PATENT DOCUMENTS

JP   2022521748 A   4/2022
WO  2017036414 A1   3/2017
(Continued)

OTHER PUBLICATIONS

Document: JVET-M1001-v3, Benjamin Bross et al., Versatile Video Coding (Draft 4), Joint Video Experts Team (JVET) of ITU-T SG 16 WP 3 and ISO/IEC JTC 1/SC 29/WG 11, 13th Meeting: Marrakech, MA, Jan. 9-18, 2019, total 254 pages.
(Continued)

*Primary Examiner* — Nathnael Aynalem
(74) *Attorney, Agent, or Firm* — WOMBLE BOND DICKINSON (US) LLP

(57) ABSTRACT

It is provided a method of video coding implemented in a decoding device or an encoding device, the method comprising: obtaining initial motion vectors for a current block; obtaining first predictions for a sample value in the current block based on the initial motion vectors; calculating a first matching cost according to the first predictions; determining whether an optical flow refinement process should be performed or not, according to at least one preset condition, the at least one preset condition comprising a condition of whether the calculated first matching cost is equal to or larger than a threshold value; and performing an optical flow refinement process for obtaining a final inter prediction for
(Continued)

the sample value in the current block, when it is determined that the optical flow refinement process should be performed.

20 Claims, 12 Drawing Sheets

Related U.S. Application Data continuation of application No. PCT/CN2020/076178, filed on Feb. 21, 2020.

(51) Int. Cl.
*H04N 19/159* (2014.01)
*H04N 19/176* (2014.01)
*H04N 19/82* (2014.01)

(58) Field of Classification Search
CPC .... H04N 19/159; H04N 19/52; H04N 19/137; H04N 19/513; H04N 19/521; H04N 19/573; H04N 19/103; H04N 19/136; H04N 19/196; H04N 19/51; H04N 19/517; H04N 19/82; H04N 19/117; H04N 19/184; H04N 19/56; H04N 19/115; H04N 19/119; H04N 19/44; H04N 19/463; H04N 19/50; H04N 19/557; H04N 19/593; H04N 19/13; H04N 19/182; H04N 19/523; H04N 19/533; H04N 19/537; H04N 19/91; H04N 19/503; H04N 19/507
USPC ............................................ 375/240–240.29
See application file for complete search history.

(56) References Cited

U.S. PATENT DOCUMENTS

| | | |
|---|---|---|
| 2018/0199057 A1 | 7/2018 | Chuang et al. |
| 2018/0242004 A1 | 8/2018 | Park et al. |
| 2018/0249172 A1 | 8/2018 | Chen et al. |
| 2019/0132606 A1* | 5/2019 | Su ........................ H04N 19/577 |
| 2020/0221122 A1* | 7/2020 | Ye ........................ H04N 19/176 |
| 2021/0266585 A1* | 8/2021 | Liu ..................... H04N 19/139 |

FOREIGN PATENT DOCUMENTS

| | | |
|---|---|---|
| WO | 2017133661 A1 | 8/2017 |
| WO | 2018173895 A1 | 9/2018 |
| WO | 2019001741 A1 | 1/2019 |
| WO | 2019010156 A1 | 1/2019 |
| WO | 2020169083 A1 | 8/2020 |

OTHER PUBLICATIONS

ITU-T H.264(Apr. 2017), Series H: Audiovisual and Multimedia Systems, Infrastructure of audiovisual services-Coding of moving video, Advanced video coding for generic audiovisual services, total 812 pages.

ITU-T H.265(Feb. 2018), Series H: Audiovisual and Multimedia Systems Infrastructure of audiovisual services-Coding of moving video, High efficiency video coding, total 692 pages.

Document: JVET-K0344-v1, Xiaoyu Xiu et al, CE9.5.3: Bi-directional optical flow (BIO) simplification, Joint Video Experts Team (JVET) of ITU-T SG 16 WP 3 and ISO/IEC JTC 1/SC 29/WG 11, 11th Meeting: Ljubljana, SI, Jul. 10-18, 2018, 2 pages.

Xiaoyu Xiu, et al., Description of SDR, HDR, and 360 video coding technology proposal by InterDigital Communications and Dolby Laboratories, Joint Video Experts Team (JVET) of ITU-T SG 16 WP 3 and ISO/IEC JTC 1/SC 29/WG 11, JVET-J0015-v1, 10th Meeting: San Diego, US, Apr. 2018, pp. 1-9.

Document: JVET-K0485-v1, Xiaoyu Xiu et al., CE9-related: A simplified bi-directional optical flow (BIO) design based on the combination of CE9.5.2 test 1 and CE9.5.3, Joint Video Experts Team (JVET) of ITU-T SG 16 WP 3 and ISO/IEC JTC 1/SC 29/WG 11, 11th Meeting: Ljubljana, SI, Jul. 10-18, 2018, 3 pages.

Kenji Kondo, Masaru Ikeda, and Teruhiko Suzuki, Non-CE 9: On early termination for BDOF, Joint Video Experts Team (JVET) of ITU-T SG 16 WP 3 and ISO/IEC JTC 1/SC 29/WG 11, JVET-M0073-r2, 13th Meeting: Marrakech, MA, Jan. 2019, pp. 1-5.

Document: JVET-L0061, Kiho Choi et al, CE9-related: Bi-directional optical flow for VTM, Joint Video Experts Team (JVET) of ITU-T SG 16 WP 3 and ISO/IEC JTC 1/SC 29/WG 11, 12th Meeting: Macao, CN, Oct. 3-12, 2018, 2 pages.

Kyohei Unno, Kei Kawamura, and Sei Naito, CE9-related: Alternative method of SAD based early termination for BDOF, Joint Video Experts Team (JVET) of ITU-T SG 16 WP 3 and ISO/IEC JTC 1/SC 29/WG 11, JVET-N0158-v2, 14th Meeting: Geneva, CH, Mar. 2019, pp. 1-4.

Document: JVET-M0249, Hongbin Liu et al, Non-CE9: Modifications on Bi-Directional Optical Flow, Joint Video Experts Team (JVET) of ITU-T SG 16 WP 3 and ISO/IEC JTC 1/SC 29/WG 11, 13th Meeting: Marrakech, MA, Jan. 9-18, 2019, 3 pages.

* cited by examiner

EARLY TERMINATION FOR OPTICAL FLOW REFINEMENT

CROSS-REFERENCE TO RELATED APPLICATIONS

This application is a continuation of U.S. patent application Ser. No. 17/407,617, filed on Aug. 20, 2021, which is a continuation of International Application No. PCT/CN2020/076178, filed on Feb. 21, 2020, which claims the priority to Indian Provisional Patent Application No. IN201931007114, filed on Feb. 22, 2019. All of the aforementioned patent applications are hereby incorporated by reference in their entireties.

TECHNICAL FIELD

The present disclosure relates to the field of picture processing and more particularly to optical flow refinement.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

Recently, inter prediction coding was improved by bi-predictive optical flow refinement. This technique may improve the accuracy of the inter prediction of a current block of a picture to be coded. However, bi-predictive optical flow refinement is relatively expensive in terms of computational load. Thus, a compromise between accurate inter prediction and computational load has to be found. The present disclosure addresses this problem.

SUMMARY

Embodiments of the present application provide apparatuses and methods for encoding and decoding according to the independent claims.

The foregoing and other objects are achieved by the subject matter of the independent claims. Further implementation forms are apparent from the dependent claims, the description and the figures.

It is provided in an embodiment a method of video coding implemented in a decoding device or an encoding device, the method comprising:
   obtaining initial motion vectors for a current block (for example, a coding block or a prediction block or a sub-block);
   obtaining first predictions (two prediction values for inter biprediction) for a sample value in the current block based on the initial motion vectors;
   calculating a first matching cost (for example, consisting of or comprising some similarity (or dis-similarity) measure; see also detailed description below) according to the first predictions;
   determining whether an optical flow refinement process should be performed or not, according to at least one preset condition, the at least one preset condition comprising a condition of whether the calculated first matching cost is equal to or larger than a threshold;
   performing an optical flow refinement process for obtaining a final inter prediction for the sample value in the current block, when it is determined that the optical flow refinement process should be performed.

Thus, according to the disclosure performance of optical flow refinement, in particular, bidirectional optical flow refinement is performed on a conditional basis. The relatively expensive optical flow refinement is only performed under certain circumstances that allow for a suitable desirable improvement of accuracy of the entire inter prediction process. If it is determined that the optical flow refinement does probably not result in an improvement of accuracy of the inter prediction that is worth the relatively high computational load needed for performing the optical flow refinement, optical flow refinement may be suppressed. Decoding time can, thus, be significantly reduced. The initial motion vectors may be signaled in a bitstream. Alternatively, motion vector predictions and motion vector difference components may be provided for the initial motion vectors.

For example, the at least one preset condition comprises the condition that the current block is allowed to be predicted by decoder-side motion vector refinement. This particular condition comprised in the at least one preset condition may be checked in the first place in order to avoid unnecessary computational efforts.

According to a particular embodiment, it is determined that the optical flow refinement process should be performed, when it is determined that all of the at least one preset conditions are fulfilled. The at least one preset condition may comprise one or more additional conditions, in principle. For example, the at least one preset conditions may comprise a condition that a particular flag is set (to 1, for example) in order to have the optical refinement process being performed. If the conditions are not all fulfilled no optical flow refinement might be performed at all according to a particular embodiment in order to reduce computational demands.

The first predictions for the sample value in the current block may be obtained based on a first interpolation filter in order to achieve some sub-pixel accuracy. In particular, the first interpolation filter may be a relatively simple bilinear interpolation filter that allows for fast filter processing.

The inventive method of video coding implemented in a decoding device or an encoding device may comprise some motion vector refinement different from the optical flow refinement. Thus, the method may comprise obtaining refined motion vectors based on the initial motion vectors and the first matching cost; obtaining second predictions for the sample value in the current block according to the refined motion vectors, when it is determined that the optical flow refinement process should be performed, performing the optical flow refinement based on the second predictions (representing already refined predictions). The overall accuracy of the inter prediction process may be enhanced by the employment of the refined motion vectors.

It is noted that the first predictions as well as the first matching cost are already computed for the motion vector refinement. Therefore, no extra computations are necessary for deciding on an early termination/suppression of the optical flow refinement process, but the results of the previous computations involved in the motion vector refinement process can be reused.

In each of the above-described embodiments of the inventive method the obtaining first predictions for a sample value in the current block based on the initial motion vectors may comprise obtaining a number of pairs of candidates based on the initial motion vectors and obtaining first predictions for a sample value in the current block based on at least one of the pairs of candidates and the calculating a first matching cost according to the first predictions may comprise determining a matching cost for each of the pairs of candidates based on the first predictions and determining the smallest matching cost of the determined matching costs as the first matching cost.

In course of the motion vector refinement a number of pairs of candidates for the refined motion vectors may be obtained, the pairs including a pair of the initial motion vectors. For example, the pairs of candidates for the refined motion vectors comprise a pair of the initial motion vectors (MV0, MV1) and pairs (MV0+(0,1), MV1+(0,−1)), (MV0+(1,0), MV1+(−1,0)), (MV0+(0,−1), MV1+(0,1)), (MV0+(−1,0), MV1+(1,0)), where (1,−1) denotes a vector that has a displacement of 1 in the horizontal (or x) direction and a displacement of −1 in the vertical (or y) direction. For each of the pairs a matching cost corresponding to that pair can be determined and the above-mentioned the first matching cost can be determined to be the smallest one of the matching costs determined for the pairs of candidates for the refined motion vectors. According to particular examples, it can be the matching cost corresponding to the pair of initial motion vectors (MV0, MV1) or (MV0'=MV0+(0,1), MV1'=MV1+(0,−1)) with the refined motion vectors MV0' and MV1'.

Employment of that kind of first matching cost may be advantageous in terms of the overall coding.

The above-mentioned second predictions for the sample value in the current block may obtained according to a second interpolation filter. This second interpolation filter may be a 6-tap or 8-tap interpolation filter which is relatively expensive but advantageous in terms of sub-pixel accuracy.

The above-mentioned refined motion vectors may be obtained according to a second matching cost in order to control the suitability of the refined motion vectors for the inter prediction. When a value of the second matching cost is greater than or equal to another threshold value, it may be determined that the optical flow refinement process should be performed. Otherwise, it may be determined that it is not worth performing any optical flow refinement processing.

According to another embodiment, only when it is determined that the optical flow refinement process should not be performed, the final inter prediction is obtained by a weighted sum of the second predictions. The weighted sum of the second predictions provides some accuracy that might be considered sufficient in cases in that it is not considered appropriate to perform the relatively costly optical flow refinement process.

In general, the threshold value or the other threshold value may be a value that is computed based on the bit-depth of the first predictions. Moreover, the threshold value may be obtained according to the number of predicted samples that are used for computing the first matching cost according to the first predictions. Further, the threshold value may be obtained according to the size (width and height in terms on the number of pixels) of the current block. For example, the threshold can be thr=nCbW×nCbH×K, where K is a value greater than zero, nCbW and nCbH are the width and height of the current block. For example, K=2.

Furthermore, the above-mentioned second matching cost may be a derived cost obtained using matching costs evaluated during motion vector refinement and a pre-defined model for the shape of the matching cost near the minimum matching cost position. The pre-defined model in this context may be a linear combination model. Using a pre-defined model for the shape of the matching cost near the minimum matching cost position may improve the accuracy of the inter prediction process.

The method according to all of the above-described embodiments may further comprise the operation of generating an inter prediction block comprising the final inter prediction for the sample value in the current block.

Furthermore, it is provided an encoder or a decoder comprising some processing circuitry for carrying out the method according to any one of the above-described embodiments. Further, it is provided a computer program product comprising a program code for performing the method according to any one of the above-described embodiments.

All of the above-described embodiments of the method of video coding can be implemented in a decoder or an encoder. Thus, it is provided a decoder or an encoder, comprising:

one or more processors and a non-transitory computer-readable storage medium coupled to the processors and storing programming for execution by the processors, wherein the programming, when executed by the processors, configures the decoder to carry out the method according to any one of the above-described embodiments.

All of the above-described embodiments of the method of video coding can be implemented in a device for use in an image encoder and/or an image decoder in order to address the above-mentioned need. Thus, it is provided a device for use in an image encoder and/or an image decoder, the device comprising an initial motion vector unit configured for obtaining initial motion vectors for a current block (for example, a coding block or a prediction block or a sub-block); a first prediction unit configured for obtaining first predictions for a sample value in the current block based on the initial motion vectors; a first matching cost calculation unit configured for calculating a first matching cost (for example, a similarity or dis-similarity measure) according to the first predictions; an optical flow refinement process determination unit configured for determining whether an optical flow refinement process should be performed or not, according to at least one preset condition, the at least one preset condition comprising a condition of whether the calculated first matching cost is equal to or larger than a threshold; and an optical flow refinement process performance unit configured for performing an optical flow refinement process for obtaining a final inter prediction for the sample value in the current block, when it is determined that the optical flow refinement process should be performed.

This device, as described above and with its embodiments described below provides the same advantages as the above-described methods.

The at least one preset condition may comprise the condition that the current block is allowed to be predicted by decoder-side motion vector refinement.

The optical flow refinement process determination unit may be configured for determining that the optical flow refinement process should be performed, when it is determined that all of the at least one preset conditions are fulfilled.

The device may comprise a first interpolation filter (for example, a bilinear interpolation filter) and the first prediction unit may be configured for obtaining the first predictions for the sample value in the current block by means of the first interpolation filter.

The device may further comprise a refined motion vector unit configured for obtaining refined motion vectors based on the initial motion vectors and the first matching cost;
a second prediction unit configured for obtaining second predictions for the sample value in the current block according to the refined motion vectors; and
the optical flow refinement process performance unit may be configured for performing the optical flow refinement based on the second predictions, when it is determined by the optical flow refinement process determination unit that the optical flow refinement process should be performed.

In the above-described embodiments of the device the first prediction unit may be configured for obtaining the first predictions for a sample value in the current block based on the initial motion vectors by obtaining a number of pairs of candidates based on the initial motion vectors and obtaining first predictions for a sample value in the current block based on at least one of the pairs of candidates. Moreover, the first matching cost calculation unit may be configured for calculating the first matching cost according to the first predictions by determining a matching cost for each of the pairs of candidates based on the first predictions and determining the smallest matching cost of the determined matching costs as the first matching cost.

According to an embodiment, the device may further comprise a second interpolation filter (for example, a relatively expensive 6-tap or 8-tap interpolation filter of relatively high sub-pixel accuracy) and the second prediction unit may be configured for obtaining the second predictions for the sample value in the current block by means of the second interpolation filter.

According to another embodiment, the device further comprises a second matching cost calculation unit configured for calculating a second matching cost and wherein the refined motion vector unit is configured for obtaining the refined motion vectors according to the second matching cost. In this case, the optical flow refinement process determination unit may be configured for determining that the optical flow refinement process should be performed when a value of the second matching cost is greater than or equal to another threshold value.

The device may further comprise a weighted sum prediction unit configured for obtaining the final inter prediction by a weighted sum of the second predictions only when it is determined by the optical flow refinement process determination unit that the optical flow refinement process should not be performed.

Further, the device may comprise a threshold calculation unit configured for calculating the threshold value or the other threshold based on the bit-depth of the first predictions.

Also, the device may further comprise a threshold calculation unit configured for calculating the threshold according to the number of predicted samples that are used for computing the first matching cost according to the first predictions by the first matching cost calculation unit. Also, the device may further comprise a threshold calculation unit configured for calculating the threshold according to the size of the current block. For example, the threshold can be thr=nCbW×nCbH×K, where K is a value greater than zero, nCbW and nCbH are the width and height of the current block. For example, K=2.

According to particular embodiments, the second matching cost calculation unit is configured for calculating the second matching cost as a derived cost obtained using matching costs evaluated during motion vector refinement performed by the refined motion vector unit and a predefined model (for example, a linear combination model) for the shape of the matching cost near the minimum matching cost position.

The device according to any of the above-descried embodiments may further comprise an inter prediction block generating unit configured for generating an inter prediction block comprising the final inter prediction for the sample value in the current block.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the disclosure are described in more detail with reference to the attached figures and drawings, in which.

Figure 1A:
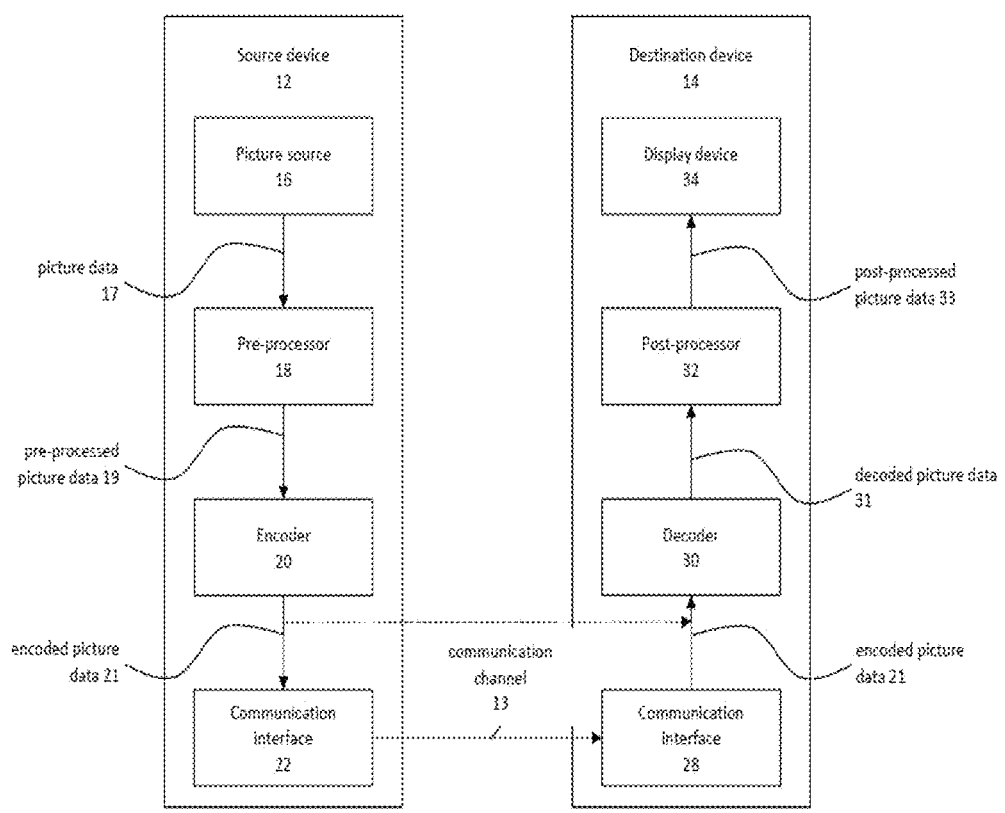
FIG. 1A is a block diagram showing an example of a video coding system configured to implement embodiments of the disclosure.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method operations are described, a corresponding device may include one or a plurality of units, e.g. functional units, to perform the described one or plurality of method operations (e.g. one unit performing the one or plurality of operations, or a plurality of units each performing one or more of the plurality of operations), even if such one or more units are not explicitly described or illustrated in the figures. On the other hand, for example, if a specific apparatus is described based on one or a plurality of units, e.g. functional units, a corresponding method may include one operation to perform the functionality of the one or plurality of units (e.g. one operation performing the functionality of the one or plurality of units, or a plurality of operations each performing the functionality of one or more of the plurality of units), even if such one or plurality of operations are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g.

from RGB to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
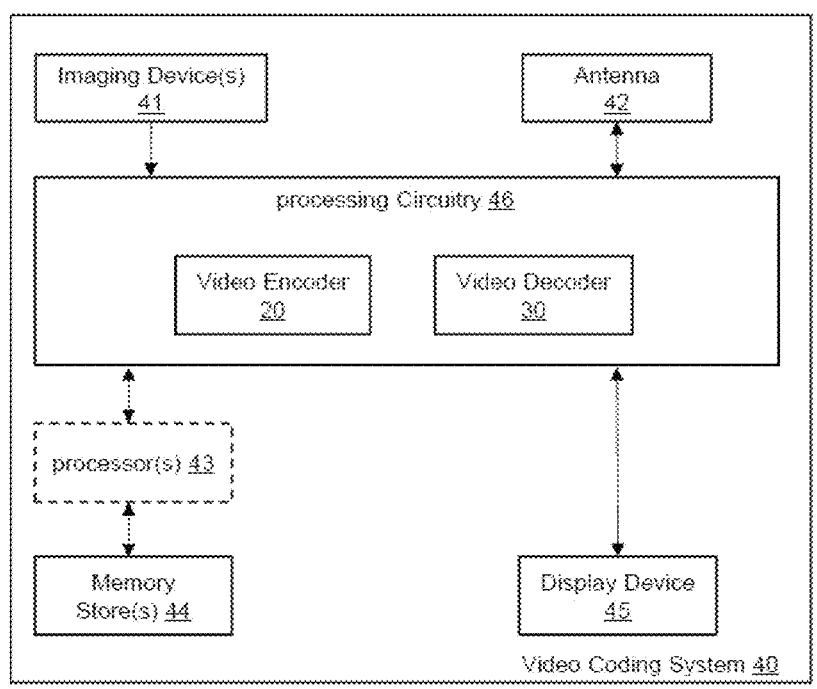
FIG. 1B is a block diagram showing another example of a video coding system configured to implement embodiments of the disclosure.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC.

Encoder and Encoding Method

Figure 2:
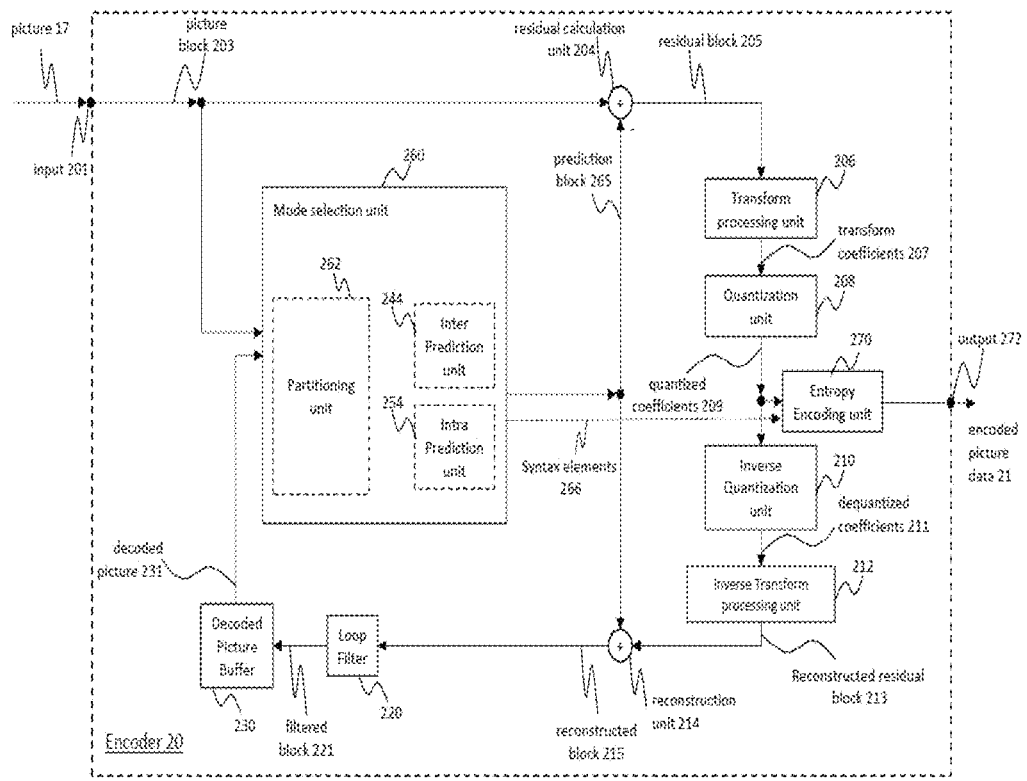
FIG. 2 is a block diagram showing an example of a video encoder configured to implement embodiments of the disclosure.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
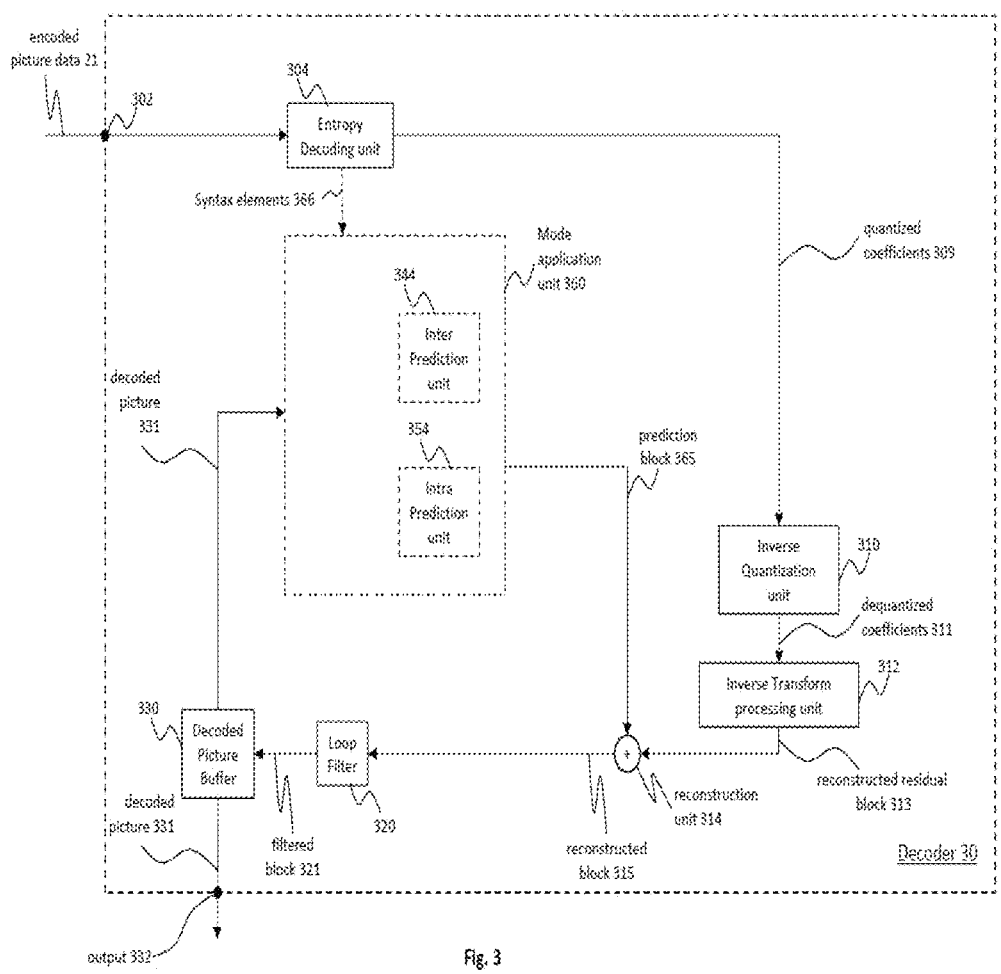
FIG. 3 is a block diagram showing an example structure of a video decoder configured to implement embodiments of the disclosure.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured to encode the picture 17 block by block, e.g. the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs).

Embodiments of the video encoder 20 as shown in FIG. 2 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example, for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.
Filtering The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.
Decoded Picture Buffer The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.
Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.
Partitioning The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. trec-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), a combined Quad-tree and binary tree (QTBT) partitioning is for example used to partition a coding block. In the QTBT block structure, a CU can have either a square or rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition may be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs).

Embodiments of the video decoder 30 as shown in FIG. 3 may be configured to partition and/or decode the picture by using tile groups (also referred to as video tile groups) and/or tiles (also referred to as video tiles), wherein a picture may be partitioned into or decoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current operation may be further processed and then output to the next operation. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{\wedge}(\text{bitDepth}-1) \sim 2^{\wedge}(\text{bitDepth}-1)-1$, where "^" means exponentiation. For example, if bitDepth is set equal to 16, the range is $-32768 \sim 32767$; if bitDepth is set equal to 18, the range is $-131072 \sim 131071$. For example, the value of the derived motion vector (e.g. the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth.

Method 1: Remove the Overflow MSB (Most Significant Bit) by Flowing Operations $$ux = (mvx + 2^{bitDepth}) \% \ 2^{bitDepth} \qquad (1)$$

$$mvx = (ux >= 2^{bitDepth-1}) ? (ux - 2^{bitDepth}) : ux \qquad (2)$$

$$uy = (mvy + 2^{bitDepth}) \% \ 2^{bitDepth} \qquad (3)$$

$$mvy = (uy >= 2^{bitDepth-1}) ? (uy - 2^{bitDepth}) : uy \qquad (4)$$

where mvx is a horizontal component of a motion vector of an image block or a sub-block, mvy is a vertical component of a motion vector of an image block or a sub-block, and ux and uy indicates an intermediate value;

For example, if the value of mvx is −32769, after applying formula (1) and (2), the resulting value is 32767. In computer system, decimal numbers are stored as two's complement. The two's complement of −32769 is 1,0111,1111, 1111,1111 (17 bits), then the MSB is discarded, so the resulting two's complement is 0111,1111,1111,1111 (decimal number is 32767), which is same as the output by applying formula (1) and (2).

$$ux = \left(mvpx + mvdx + 2^{bitDepth}\right) \% \; 2^{bitDepth} \tag{5}$$

$$mvx = \left(ux >= 2^{bitDepth-1}\right)?\left(ux - 2^{bitDepth}\right):ux \tag{6}$$

$$uy = \left(mvpy + mvdy + 2^{bitDepth}\right) \% \; 2^{bitDepth} \tag{7}$$

$$mvy = \left(uy >= 2^{bitDepth-1}\right)?\left(uy - 2^{bitDepth}\right):uy \tag{8}$$

The operations may be applied during the sum of mvp and mvd, as shown in formula (5) to (8).

Method 2: Remove the Overflow MSB by Clipping the Value $$vx = \text{Clip3}\left(-2^{bitDepth-1}, 2^{bitDepth-1} - 1, vx\right)$$

$$vy = \text{Clip3}\left(-2^{bitDepth-1}, 2^{bitDepth-1} - 1, vy\right)$$

where vx is a horizontal component of a motion vector of an image block or a sub-block, vy is a vertical component of a motion vector of an image block or a sub-block; x, y and z respectively correspond to three input value of the MV clipping process, and the definition of function Clip3 is as follow:

$$\text{Clip3}(x, \; y, \; z) = \begin{cases} x \; ; & z < x \\ y \; ; & z > y \\ z \; ; & \text{otherwise} \end{cases}$$

Figure 4:
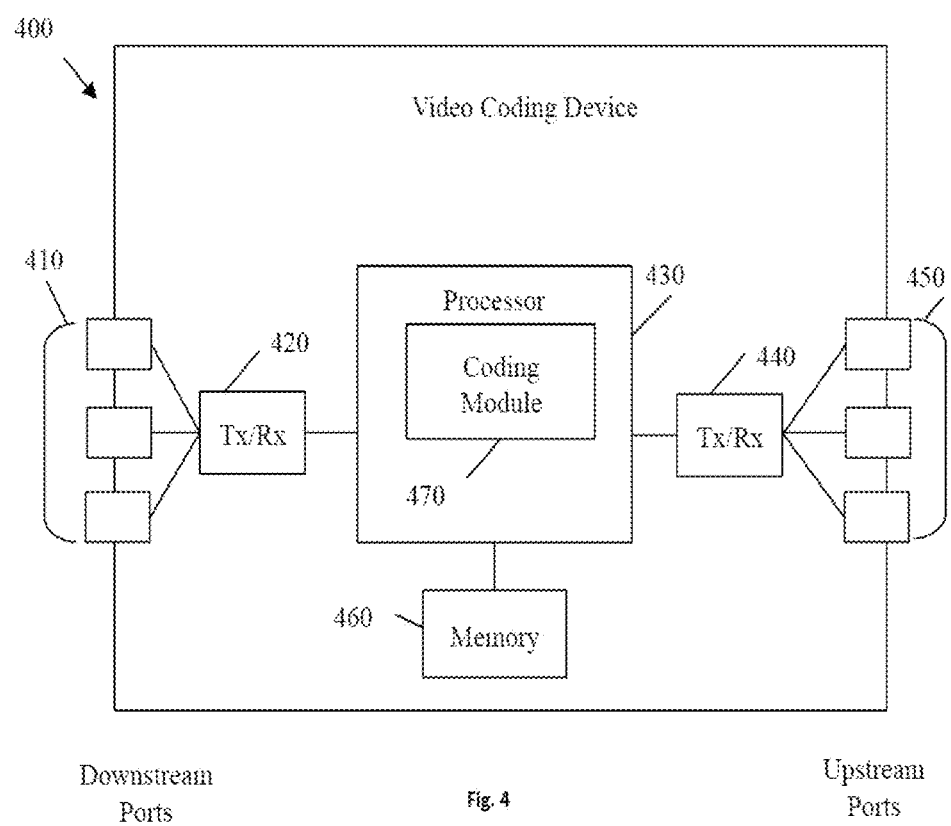
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAS, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
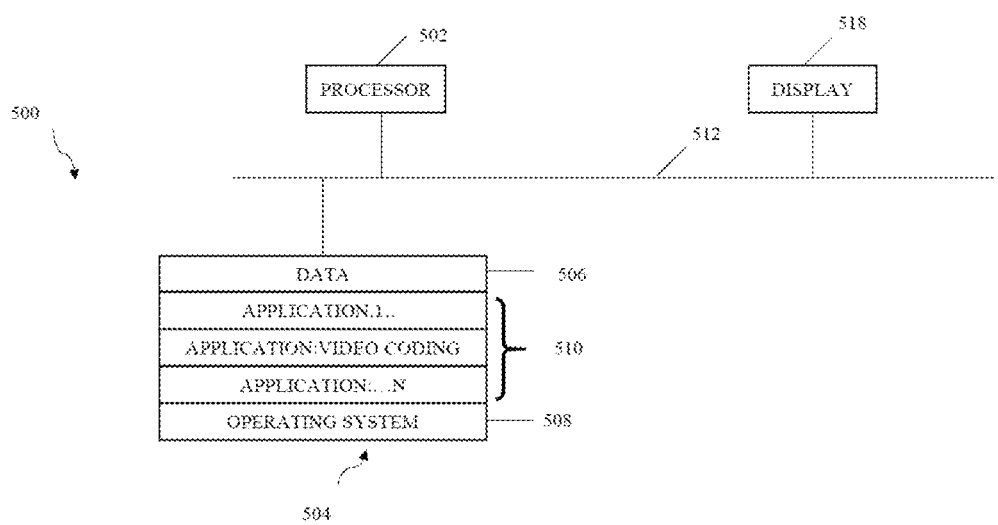
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Motion Vector Refinement (MVR)

Motion vectors are usually at least partially determined at the encoder side and signaled to the decoder within the coded bitstream. However, the motion vectors may also be refined at the decoder (and also at the encoder) starting from initial motion vectors indicated in the bitstream. In such case, for instance, similarity between the patches of already decoded pixels pointed by the initial motion vectors may be used to improve the accuracy of the initial motion vectors. Such motion refinement provides an advantage of reducing the signaling overhead: the accuracy of the initial motion is improved in the same way at both the encoder and the decoder and thus, no additional signaling for the refinement is needed.

It is noted that the initial motion vectors before refinement might not be the best motion vectors that result in the best prediction. Since the initial motion vectors are signaled in the bitstream, it might not be possible to represent the initial motion vector with very high accuracy (which would increase the bitrate), therefore the motion vector refinement process is utilized to improve the initial motion vector. Initial motion vectors might, for instance, be the motion vectors that are used in the prediction of a neighbor block of a current block. In this case it is enough to signal an indication in the bitstream, indicating motion vectors of which neighbor block is used by the current block. Such a prediction mechanism is very efficient in reducing the number of bits to represent the initial motion vectors. However the accuracy of the initial motion vectors might be low, since in general the motion vectors of two neighboring blocks are not expected to be identical.

In order to further improve the accuracy of motion vectors without further increase in signaling overhead, it may be beneficial to further refine the motion vectors derived at the encoder side and provided (signaled) in the bitstream. The motion vector refinement may be performed at the decoder without assistance from the encoder. The encoder in its decoder loop may employ the same refinement to obtain corresponding refined motion vectors as would be available at the decoder. The refinement for a current block that is being reconstructed in a current picture is performed by determining a template of reconstructed samples, determining a search space around the initial motion information for the current block and finding in the search space a reference picture portion best matching the template. The best matching portion determines the refined motion vectors for the current block which is then used to obtain the Inter-predicted samples for the current block, i.e. the current block being reconstructed.

Motion vector refinement is a part of Inter Prediction Unit (244) in FIGS. 2 and 344 in FIG. 3.

The motion vector refinement may be performed according to the following operations:

Typically, an initial motion vectors can be determined based on an indication in the bitstream. For example, an index might be signaled in the bitstream which indicates a position in a list of candidate motion vectors. In another example, a motion vector predictor index and motion vector difference value can be signaled in the bitstream. Motion vectors that are determined based on an indication in the bitstream are defined to be initial motion vectors. In the case of bi-prediction, where the inter-prediction for the current block is obtained as a weighted combination of the predicted block of samples which are determined according to two motion vectors, let the initial motion vector in a first reference picture in list L0 be denoted as MV0; and the initial motion vector in the second reference picture in list L1 be denoted as MV1.

Using the initial motion vectors, refinement candidate motion vector (MV) pairs are determined. At least, two refinement candidate pairs need to be determined. Typically, the refinement candidate motion vector pairs are determined based on the initial motion vector pair (MV0, MV1). Furthermore, the candidate MV pairs are determined by adding small motion vector differences to MV0 and MV1. For example, the candidate MV pairs might include the following:

(MV0, MV1)

(MV0 + (0, 1), MV1 + (0, −1))

(MV0 + (1, 0), MV1 + (−1, 0))

(MV0 + (0, −1), MV1 + (0, 1))

(MV0 + (−1, 0), MV1 + (1, 0))

...

Where (1,−1) denotes a vector that has a displacement of 1 in the horizontal (or x) direction and a displacement of −1 in the vertical (or y) direction.

It is noted that the above list of candidate pairs are just examples for explanation and the disclosure is not limited to a specific list of candidates.

Refinement candidate motion vector (MV) pairs form the search space of the motion vector refinement process.

In a bi-prediction of current block, two prediction blocks obtained using the respective first motion vector of list L0 and the second motion vector of list L1, are combined to a single prediction signal, which can provide a better adaptation to the original signal than uni-prediction, resulting in less residual information and possibly a more efficient compression.

In motion vector refinement, the two prediction blocks obtained using the respective first motion vector and the second motion vector of a candidate MV pair are compared based on a similarity metric for each of the refinement candidate MV pairs. A candidate MV pair resulting in the highest similarity is usually selected as the refined motion vectors. Denoted as MV0' and MV1', refined motion vector in a first reference picture in list L0 and refined motion vector in a second reference picture in list L1 respectively. In other words, predictions are obtained corresponding to list L0 motion vector and list L1 motion vector of the candidate motion vector pair, which are then compared based on a similarity metric. The candidate motion vector pair that has the highest associated similarity is selected as refined MV pair.

Typically, the output of the refinement process are refined MVs. The refined MVs might be same as the initial MVs or might be different with the initial MVs, depending on which candidate MV pair achieves the highest similarity, the candidate MV pair formed by initial MVs are also among the MV pair candidates. In other words, if the highest candidate MV pair that achieves the highest similarity is formed by the initial MVs, the refined MVs and initial MVs are equal to each other.

Instead of selecting the position that maximizes a similarity metric, another method is select a position that minimizes a dis-similarity metric. The dis-similarity comparison measure might be SAD (Sum of absolute differences), MRSAD (mean removed sum of absolute differences, SSE (Sum of Squared Error) etc. The SAD between two prediction blocks may be obtained using a candidate MV pair (CMV0, CMV1), the SAD can be computed as follows:

$$SAD(CMV0, CMV1) = \sum_{x=0}^{nCbW-1} \sum_{y=0}^{nCbH-1} abs(predSamplesL0[x][y] - predSamplesL1[x][y])$$

where nCbH and nCbW are height and the width of the prediction blocks, the function abs(a) specifies the absolute value of the argument a, predSAmplesL0 and predSAmplesL1 are prediction block samples obtained according to candidate MV pair which is denoted by (CMV0, CMV1).

Alternatively, the dis-similarity comparison measures can be obtained by evaluating only a subset of samples in a prediction block, in order to reduce the number of computations. An example is below, where rows of samples are alternatively included in the SAD calculation (every second row is evaluated).

$$SAD(CMV0, CMV1) = \sum_{x=0}^{nCbW-1} \sum_{y=0}^{nCbH/2-1} abs(predSamplesL0[x][2*y] - predSamplesL1[x][2*y])$$

One example of motion vector refinement is explained in the document JVET-M1001-v3, "Versatile Video Coding (Draft 4)" of JVET (of ITU-T SG 16 WP 3 and ISO/IEC JTC 1/SC 29/WG 11) which is publicly available under http://phenix.it-sudparis.eu/jvet/". The section "8.4.3 Decoder side motion vector refinement process" in the document exemplifies the motion vector refinement.

In order to reduce internal memory requirements for refinement, in some embodiments, the motion vector refinement process may be performed independently on blocks of luma samples obtained by partitioning coded block of samples that exceed a certain pre-determined width or pre-determined height in luma samples into sub-blocks of samples that are less than or equal to the pre-determined width and pre-determined height in luma. The refined MV pair for each sub-block within a partitioned coded block can be different. Inter-prediction for both luma and chroma are then performed for each sub-block using the refined MV pair of that sub-block.

Each MV of the initial MV pair can have a fractional pixel precision. In other words, the MV indicates a displacement between a current block of samples and a re-sampled reference region and this displacement can point to a fractional position in the horizontal and vertical directions from the integer grid of reconstructed reference samples. Typically, a 2-dimensional interpolation of the reconstructed reference integer sample grid values is performed to obtain the sample values at the fractional sample offset location. The process of obtaining predicted samples from the reconstructed reference pictures using a candidate MV pair can be through one of the following methods:

Round the fractional part of the initial MV pair to the nearest integer location and obtain the integer grid values of the reconstructed reference pictures.

Perform a 2-tap (e.g. bilinear) separable bilinear interpolation to obtain the predicted sample values at the fractional pixel accuracy indicated by the initial MV pair.

Perform a higher tap (e.g. 8-tap or 6-tap) separable interpolation to obtain the predicted sample values at the fractional pixel accuracy indicated by the initial MV pair.

While the candidate MV pairs can have arbitrary sub-pixel offset with respect to the initial MV pair, in some embodiments, for the sake of simplicity of search, the candidate MV pairs are chosen with integer pixel distance with respect to the initial MV pair. In such cases, the predicted samples across all the candidate MV pair can be obtained by performing a prediction for a block of samples around the initial MV pair to cover all the refinement positions around the initial MV pair.

In some embodiments, once the dis-similarity cost value at all the candidate MV pairs at an integer distance from the initial MV pair have been evaluated, additional candidate MV pairs at sub-pixel distance offsets from the best cost value position are added. Predicted samples are obtained for each of these positions using one of the methods described earlier and the dis-similarity costs are evaluated and compared to obtain the lowest dis-similarity position. In certain other embodiments, to avoid this computationally expensive prediction process for each sub-pixel distance position around the best cost integer-distance position, the integer-distance cost values evaluated are remembered and a parametric error surface is fitted in the vicinity of the best integer-distance position. The minimum of this error surface is then analytically computed and used as the position with the minimum dis-similarity. In such cases, the dis-similarity cost value is said to be derived from the computed integer-distance cost values.

The application of motion vector refinement for a given coded block of samples can be conditioned on certain coding properties of the coded block of samples. Some examples of such coding properties can be:

The distance in number of pictures (when sampled at a uniform frame-rate) from the current picture to the two reference picturess used for bi-prediction of the coded block of samples are equal and fall on opposite sides of the current picture.

The initial dis-similarity between the two predicted blocks obtained using the initial MV pair is less than a pre-determined per-sample threshold.

Bi-Predictive Optical Flow Refinement (BPOF)

Bi-predictive optical flow refinement is a process of improving the accuracy of bi-prediction of a block, without explicitly additional signaling in the bitstream other than signaled for bi-prediction. It is a part of Inter Prediction Unit (244) in FIGS. 2 and 344 in FIG. 3.

In bi-prediction, 2 inter-predictions are obtained according to two motion vectors, then the predictions are combined by application of weighted averaging. The combined prediction can result in a reduced residual energy as the quantization noise in the two reference patches get canceled out, thereby providing more coding efficiency than uni-prediction. Weighted combination in bi-prediction can be performed by an equation:

$$\text{Bi-prediction} = \text{Prediction1} * W1 + \text{Prediction2} * W2 + K,$$

where W1 and W2 are weighting factors that might be signaled in a bitstream or might be predefined in encoder side or in decoder side. K is an additive factor which might also be signaled in a bitstream or be predefined in encoder side or in decoder side. As an example, bi-prediction might be obtained using $$\text{Bi-prediction} = (\text{Prediction1} + \text{Prediction2})/2,$$

where W1 and W2 are set to ½ and K is set to 0.

The goal of optical flow refinement is to improve the accuracy of the bi-prediction. Optical flow is the pattern of apparent motion of image objects between two consecutive frames, Optical flow is caused by the movement of object or camera. Optical flow refinement process improves the accuracy of the bi-prediction by application of optical flow equation (solving of optical flow equation).

In an example, a pixel I(x,y,t) is located in a first frame (x and y corresponding to spatial coordinates, t corresponding to time dimension). The object represented by the pixel moves by distance (dx,dy) in next frame taken after dt time. Since those pixels are the same and intensity does not change, the optical flow equation is given by:

$$I(x, y, t) = I(x + dx, y + dy, t + dt)$$

I(x,y,t) specifies the intensity (sample value) of a pixel at the coordinates of (x,y,t).

In another example, small displacements and higher order terms in a Taylor series expansion are ignored, the optical flow equations can also be written as:

$$\frac{\partial I}{\partial t} + v_x \frac{\partial I}{\partial x} + v_y \frac{\partial I}{\partial y} = 0$$

Where $$\frac{\partial I}{\partial x} \text{ and } \frac{\partial I}{\partial y}$$

are the horizontal and vertical spatial sample gradients at position (x,y) and $$\frac{\partial I}{\partial t}$$

is the partial temporal derivative at (x,y).

The optical flow refinement utilizes the principle above in order to improve the quality of bi-prediction.

The implementation of optical flow refinement typically includes the operations of:
1. Calculating sample gradients;
2. Calculating difference between first prediction and second prediction;
3. Calculating displacement of pixels or group of pixels that minimizes the error Δ between the two reference patches obtained using the optical flow equation $$\Delta = \left(I^{(0)} - I^{(1)}\right) + v_x\left(\tau_0 \frac{\partial I^{(0)}}{\partial x} + \tau_1 \frac{\partial I^{(1)}}{\partial x}\right) + v_y\left(\tau_0 \frac{\partial I^{(0)}}{\partial y} + \tau_1 \frac{\partial I^{(1)}}{\partial y}\right)$$

where $I^{(0)}$ corresponds to sample value in first prediction, $I^{(1)}$ is the sample value in second prediction, and $\partial I^{(0)}/\partial x$ and $\partial I^{(0)}/\partial y$ are the gradients in $-x$ and $-y$ directions. $\tau_1$ and $\tau_0$ denote the distances to the reference pictures, where the first predition and second prediction are obtained. The motion vector ($v_x$, $v_y$) is obtained by the minimizing process. Some approaches minimize the sum of squared errors while some approaches minimize the sum of absolute error.

4. Employing an implementation of the optical flow equation, such as below:

$$pred_{BIO} = 1/2 \cdot \left(I^{(0)} + I^{(1)} + v_x/2 \cdot \left(\tau_1 \partial I^{(1)}/\partial x - \tau_0 \partial I^{(0)}/\partial x\right) + v_y/2 \cdot \left(\tau_1 \partial I^{(1)}/\partial y - \tau_0 \partial I^{(0)}/\partial y\right)\right)$$

Where $pred_{BIO}$ specifies the modified prediction which is the output of the optical flow refinement process.

Sample gradients can be obtained by the following formula $$\partial I(x, y, t)/\partial x = I(x + 1, y, t) - I(x - 1, y, t)$$
$$\partial I(x, y, t)/\partial y = I(x, y + 1, t) - I(x, y - 1, t)$$

In some embodiments, in order to simplify the complexity of estimating the displacement for each pixel, the displacement is estimated for a group of pixels. In some examples, to compute the improved bi-prediction for a block of 4×4 luma samples, the displacements are estimated using sample values of a block of 8×8 luma samples with the 4×4 block of samples at its center.

The input of optical flow refinement process are the prediction samples from two reference pictures and the output of the optical flow refinement is combined prediction (predBIO) which is calculated according to optical flow equation.

One example of optical flow refinement is explained in the 8.4.7.4 "Bidirectional optical flow prediction process" section of the document JVET-M1001, Versatile Video Coding (Draft 4).

The terms optical flow refinement, bi-predictive optical flow refinement and bidirectional optical flow refinement are used interchangeably in the disclosure, as the terms are equivalent in nature.

Figure 8:
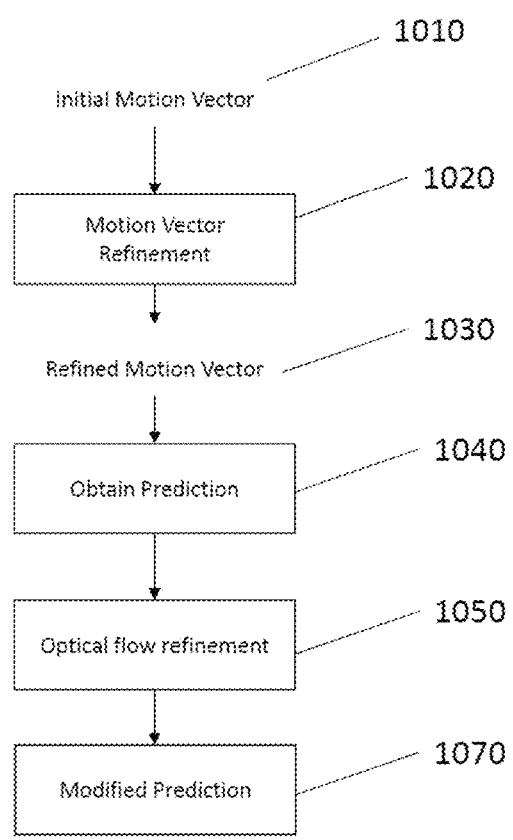
FIG. 8 is a flowchart illustrating another embodiment of optical refinement process.

In an example, motion vector refinement and optical flow refinement are applied consecutively as follows:
  Operation 0, obtain an initial motion vectors as in 1010 in FIG. 8.
  Operation 1, motion vector refinement is applied 1020, and the refined motion vectors 1030 are obtained.
  Operation 2, predictions are obtained according to refinement motion vectors 1040. The obtained predictions are $I^{(0)}$ and $I^{(1)}$, which are the input of the optical flow refinement process.
  Operation 3, optical flow refinement process is applied to the predictions, to obtain modified prediction. Modified prediction is obtained according to optical low equation and denoted as $pred_{BIO}$.

However, the optical flow refinement process is computationally intensive. Decoding time is increased by the application of optical flow refinement.

In one embodiment of the present disclosure, a method of deciding whether to apply optical flow refinement or not is disclosed, this decision may be made according to computations performed during a motion vector refinement process.

More specifically, a result of computations performed during the motion vector refinement process is used to determine whether to apply optical flow refinement or not.

The goal of the disclosure is to skip the application of optical flow refinement according to a specified condition, so that the average decoding time is reduced (by skipping the necessary computations).

According to a first exemplary embodiment, the following operations are applied in order to obtain the prediction for a current coding block:

Operation 0: obtain initial motion vectors based on an indication information in a bitstream.

Operation 1: obtain a first predictions based on the initial motion vectors and a M-tap interpolation filter.

Operation 2: obtain a matching cost according to the first predictions.

Operation 3: obtain a refined motion vector according to the initial motion vectors and the matching cost.

Operation 4: obtain a second prediction according to the refined motion vector and a K-tap interpolation filter.

Operation 5: determine whether to perform an optical flow refinement process according to the matching cost. In an example, the matching cost is compared with a threshold, and optical flow refinement process is performed when a value of the matching cost is greater than or equal to the threshold. Operation 5 also may be performed before Operation 3 or Operation 4.

Operation 6: When it's determined that the optical flow refinement process need to be performed, optical flow refinement is applied with the second prediction as input and modified second prediction as output. If determined negatively, the optical flow refinement is not applied on the second prediction. In other words, when it's determined that the optical flow refinement process need to be performed, the final prediction of the current coding block is obtained according to second prediction and according to optical flow refinement process. Otherwise the final prediction of the current coding block is obtained according to second prediction and without application of optical flow refinement process.

The detailed explanation of the operations is as follows:

In Operation 0, two initial motion vectors are obtained as input. The initial motion vectors can be determined based on an indication information in the bitstream. For example, an index might be signaled in the bitstream, the index indicates a position in a list of candidate motion vectors. In another example, a motion vector predictor index and motion vector difference value can be signaled in the bitstream. The motion vector that is determined based on an indication information in the bitstream is defined as the initial motion vectors.

In another example, reference picture indications can be obtained from the bitstream, the initial motion vectors are obtained based on the reference picture indications. The reference picture indications are used to determine the reference pictures that are pointed by the initial motion vectors.

Operation 1, Operation 2 and Operation 3 correspond to a motion vector refinement process as explained in the above examples. The initial motion vectors refined according to motion vector refinement. In one example, the matching cost is the similarity measure that is used in the motion vector refinement.

According to operation 1, first predictions are obtained corresponding to initial motion vectors. In an example, there are at least 2 pairs of candidate motion vectors in the motion vector refinement process, one of which is typically the pair formed by the initial motion vectors (MV0, MV1). In other words, the set of candidate motion vectors typically include more than one pair, wherein on of the pairs are usually (MV0, MV1). The other pair of candidate motion vectors are determined based on (MV0, MV1), by adding small perturbations to the motion vectors (as explained in the above examples).

In Operation 1, the first predictions corresponding to each pair of candidate motion vectors are obtained based on a M-tap interpolation filter. As example, one prediction corresponding to MV0 can be obtained by locating a rectangular block in a reference picture (a picture that is already encoded in the encoder or decoded in the decoder), wherein the block is pointed by MV0. Afterwards an interpolation filter is advantageously applied to the samples within the block pointed by MV0. In order to provide more accurate motion estimation, the resolution of the reference picture may be enhanced by interpolating samples between pixels. Fractional pixel interpolation can be performed by weighted averaging of the closest pixels. Here the M-tap filter might typically be a 2 4, 6, or 8 tap filter (not limited to these options), meaning that the filter has M multiplication coefficients. The prediction corresponding to MV1 can be obtained similarly, by locating a rectangular block in a same or different reference picture. The size of the rectangle is proportional to the size of the current coding block.

In operation 2, the matching cost associated with each pair of candidate motion vectors is determined according to the first predictions.

According to operation 2, at least one matching cost (for example, similarity measure) is obtained corresponding to one of the refinement candidate motion vector (MV) pairs. The higher of the similarity between two prediction blocks, the matching cost is smaller.

The said matching cost is used in the refinement of the initial motion vectors in operation 3. The refined motion vector is selected according to the said matching cost.

In Operation 4, a second prediction is obtained according to the refined motion vector and a K-tap interpolation filter. In the case of 2 refined motion vectors (MV0' and MV1'), which is the case of bi-prediction, two second predictions are obtained.

The second prediction is obtained by application of a second interpolation filter (K-tap filter), that might or might not be identical to the first interpolation filter (M-tap filter). The second prediction is obtained similarly to the first prediction, with the application of second interpolation filter and according to the block pointed by MV0' and MV1' in the reference picture.

In operation 5, the said matching cost is used to determine whether to perform an optical flow refinement process or not, according to the following:

When a value of the matching cost is smaller than a predefined threshold, the optical flow refinement is not applied. When a value of the matching cost is greater than or equal to the threshold, the optical flow refinement process is performed. If the optical flow refinement process is performed, the samples of final prediction are modified.

In operation 6, according to the output of the operation 5, if the matching cost is greater than r equal to the said threshold, the optical flow refinement process is applied to the second predictions, the second predictions are obtained according to MV0' and MV1' (refined motion vectors). The final prediction for the current coding block is obtained by perform an optical flow refinement process on the second predictions, the second predictions are pointed by MV0' and MV1'. If the matching cost is smaller than the said threshold, the final prediction is obtained according to second predictions pointed by MV0' and MV1', without the application of optical flow refinement, that means, Operation 6 is not performed.

In one implementation, the matching cost in operation 2 is a matching cost corresponding to the initial motion vector pair (which is one of the refinement candidate motion vector (MV) pairs). The matching cost might be corresponding to the MV0, MV1 pair.

In another implementation, the said matching cost in operation 2 is a matching cost equal to the smallest matching cost among the refinement candidate motion vector (MV) pairs. In other words, a matching cost is obtained corresponding to each refinement candidate motion vector pairs, and the said matching cost is equal to the smallest matching cost among those. In one example, the said matching cost is a matching cost corresponding to the refined motion vector pair MV0' and MV1', (since the refined motion vector pair (MV0', MV1') is selected since it has the smallest matching cost.

As an example, the MV pairs can constructed by the following way.

Candidate MV pairs are determined by adding small motion vector differences to MV0 and MV1. For example, the candidate MV pairs might include the following:

$$(MV0, MV1)$$
$$(MV0 + (0, 1), MV1 + (0, -1))$$
$$(MV0 + (1, 0), MV1 + (-1, 0))$$

MV0 and MV1 are initial motion vectors, MV0' and MV1' refined motion vectors throughout the application.

According to another implementation, when the optical flow refinement process is not performed, the final prediction is obtained according to the following formula:

$$\text{Bi-prediction} = \text{Prediction1} * W1 + \text{Prediction2} * W2 + K,$$

where W1 and W2 are weighting factors, W1 and W2 might be signaled in a bitstream, or W1 and W2 might be predefined at encoder side or at decoder side. K is an additive factor which might also be signaled in a bitstream or be predefined at encoder side or at decoder side. In an example, bi-prediction might be obtained using $$\text{Bi-prediction} = (\text{Prediction1} + \text{Prediction2})/2,$$

where W1 and W2 are set to ½ and K is set to 0. Prediction1 and prediction2 are the second predictions that are obtained by K-tap interpolation filtering, Prediction1 corresponds to first refined MV (MV0') and the Prediction2 corresponds to second refined MV (MV1').

The equation above achieves weighted combination of the two predictions, and the result is the final prediction for the block.

The threshold can be a predefined value, a value of the threshold may depend on the size of the prediction block. For example, the threshold can be thr=nCbW×nCbH×K, where K is a value greater than zero, nCbW and nCbH are width and height of the prediction block.

Figure 6:
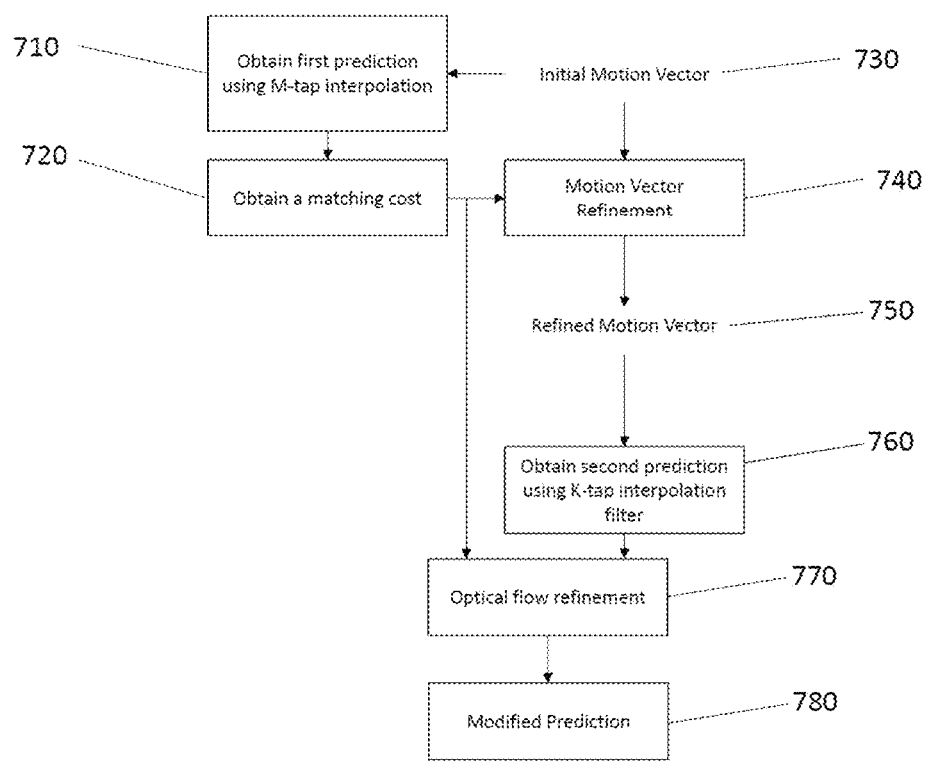
FIG. 6 is a flowchart illustrating an embodiment of optical refinement process.

The first embodiment is further exemplified by the flowchart of in FIG. 6.

In one implementation, the M-tap filter is a 2-tap filter (e.g. bilinear filter) with one of the taps equal to zero. In this implementation, the M-tap filter employs 2 multiplier coefficients, a value of one coefficient is always equal to zero. Which coefficient has a value equal to zero is determined based on a fractional sample point, that the fractional sample point is pointed by the motion vector. In this case, a value of the first multiplier coefficient, or a value of the second multiplier coefficient might be zero, depending on the fractional component of the motion vector.

Such a filter (with 2 taps, one of which is zero, can be exemplified according to the following table:

| Fractional sample position p | interpolation filter coefficients | |
|---|---|---|
| | $fb_L[\ p\ ][\ 0\ ]$ | $fb_L[\ p\ ][\ 1\ ]$ |
| 1 | 16 | 0 |
| 2 | 16 | 0 |
| 3 | 16 | 0 |
| 4 | 16 | 0 |
| 5 | 16 | 0 |
| 6 | 16 | 0 |
| 7 | 16 | 0 |
| 8 | 0 | 16 |
| 9 | 0 | 16 |
| 10 | 0 | 16 |
| 11 | 0 | 16 |
| 12 | 0 | 16 |
| 13 | 0 | 16 |
| 14 | 0 | 16 |
| 15 | 0 | 16 |

The fractional sample position (p) can be obtained according to the components of the initial or refined motion vector. For example, if the −x component of the motion vector is given by MV0x, then the fractional sample position can be obtained as p=MV0x %16, where "%" is the modulo operation. In general p=MV0x % K, where K represents the number of fractional sample positions between two sample positions. The interpolation filter exemplified above can also be called 1-tap filter, as only one of the filter taps are non-zero at a time.

In one implementation, a value of the K is equal to 8. In other examples, a value of the M is smaller than 8.

In one implementation, a value of the M and a value of the K are both equal to 8.

The initial motion vector is obtained in 710, which is the input of the motion vector refinement unit. A search space is constructed around the initial motion vector by the motion vector refinement unit (740). In one example the search space consists of candidate motion vectors pairs, first motion vector of the pair corresponding to first reference picture and the second motion vector of the pair corresponding to second reference picture. First predictions corresponding to each candidate motion vector pairs are obtained in operation 710, by application of M-tap interpolation filter. As part of motion vector refinement, a matching cost is calculated corresponding to one of the motion vector pairs in the search space (720). The said matching cost is used as part of two processes, the first process is motion vector refinement (740), where the matching cost is used to decide which motion vector pair is selected as refined motion vector pair (750). The second process is the decision of whether the optical flow refinement (770) is applied or not. After the refined motion vector is obtained, second prediction for the current block is obtained by (760). If the matching cost is greater than or equal to a threshold, optical flow refinement is applied and the prediction in 760 is modified by 770 to obtain the modified prediction (780). Modified prediction is typically different in sample values from the second prediction in operation 760.

In one example, the motion vector refinement process is performed more than once to refine the motion vector further. In this example, initial motion vectors are first refined by the motion vector refinement process, to obtain the first refined motion vector. Afterwards, motion vector refinement is performed one more time, in this case the first refined motion vector is considered as the initial motion vectors for the second motion vector refinement.

According to a second exemplary embodiment, the following operations are applied in order to obtain the prediction for a current coding block:

Operation 0: obtain initial motion vectors based on an indication information in a bitstream.

Operation 1: obtain a first predictions based on initial motion vectors and a M-tap interpolation filter.

Operation 2: obtain N matching costs according to the first predictions.

Operation 3: obtain a refined motion vector according to the initial motion vectors and the N matching costs, based on a first function.

Operation 4: obtain a second prediction according to the refined motion vector and a K-tap interpolation filter.

Operation 5: determine whether to perform an optical flow refinement process according to the N matching costs. A derived cost is obtained according to the N matching costs and a second function. In an example, the derived cost is compared with a threshold, and optical flow refinement process is performed when a value of the derived cost is greater than or equal to equal to the threshold. Operation 5 also may be performed before Operation 3 or Operation 4.

Operation 6: modify at least one sample of the prediction of the current coding block with application of optical flow refinement, when it's determined that the optical flow refinement process need to be performed.

When it's determined that the optical flow refinement process need to be performed, optical flow refinement is applied with the second prediction as input and modified second prediction as output. If determined negatively, the optical flow refinement is not applied on the second prediction. In other words, when it's determined that the optical flow refinement process need to be performed, the final prediction of the current coding block is obtained according to second prediction and according to optical flow refinement process. Otherwise the final prediction of the current coding block is obtained according to second prediction and without application of optical flow refinement process.

The detailed explanation of the operations are as follows:

In Operation 0, two initial motion vectors are obtained as input. The initial motion vector can be determined based on an indication information in the bitstream. For example, an index might be signaled in the bitstream, the index indicates a position in a list of candidate motion vectors. In another example, a motion vector predictor index and motion vector difference value can be signaled in the bitstream. The motion vector that is determined based on an indication information in the bitstream is defined as the initial motion vectors.

In another example, reference picture indications can be obtained from the bitstream, the initial motion vectors are obtained based on the reference picture indications. The reference picture indications are used to determine the reference pictures that are pointed by the initial motion vectors.

Operation 1, Operation 2 and Operation 3 correspond to a motion vector refinement process as explained in the above examples. The initial motion vectors refined according to motion vector refinement. In one example, the matching cost is the similarity measure that is used in the motion vector refinement.

According to operation 1, first predictions are obtained corresponding to initial motion vectors. In an example, there are at least 2 pairs of candidate motion vectors in the motion vector refinement process, one of which is typically the pair formed by the initial motion vectors (MV0, MV1). And the other pair of candidate motion vectors are determined based on (MV0, MV1), by adding small perturbations to the motion vectors (as explained in the above example).

In Operation 1, the first predictions corresponding to each pair of candidate motion vectors are obtained based on a M-tap interpolation filter.

In operation 2, N matching costs associated with N pairs of candidate motion vectors are determined according to the first predictions.

According to operation 2, N matching costs (similarity measure) are obtained corresponding to N of the refinement candidate motion vector (MV) pairs. The higher the similarity between two prediction blocks, the smaller the matching cost.

The said N matching costs are used in the refinement of the initial motion vectors in operation 3.

The refined motion vector is determined according to a first function and the N matching costs.

In one example the refined motion vector can be obtained according to the following function:

if (sad[3]+sad[5]) is equal to (sad[4]<<1), dmvOffset[0] is set equal to 0,

Otherwise, the following applies:

$$dmvOffset[0] = ((sad[3] - sad[5]) << 3) / (sad[3] + sad[5] - (sad[4] << 1))$$

if (sad[1] + sad[7]) is equal to (sad[4] << 1), $dmvOffset[1]$ is set equal to 0, Otherwise, the following applies:

$$dmvOffset[1] = ((sad[1] - sad[7]) << 3) / (sad[1] + sad[7] - (sad[4] << 1))$$

where dmvOffset[0] and dmvOffset[1] specify the difference between the initial and the refined motion vector. In an example, dmvOffset[0] and dmvOffset[1] specify the −x and −y component of the difference between the refined and the initial motion vectors. sad[0] to sad[7] are the N matching costs, corresponding to N candidate motion vector pairs. Refined motion vector is obtained by adding the dmvOffset to the initial motion vectors.

There might be other functions that could be used to determine the refined motion vector according to N matching costs. The first function in the disclosure is not limited to the equation above.

In Operation 4, a second prediction is obtained according to the refined motion vector and a K-tap interpolation filter. In the case of 2 refined motion vectors (MV0' and MV1'), which is the case of bi-prediction, two second predictions are obtained.

The second prediction is obtained by application of a second interpolation filter (K-tap filter), that might or might not be identical to the first interpolation filter (M-tap filter). The second prediction is obtained similarly to the first prediction, with the application of second interpolation filter and according to the block pointed by MV0' and MV1' in the reference picture.

In operation 5, a derived cost is obtained according to a second function and the said N matching costs. The derived cost is used to determine whether to perform an optical flow refinement process or not. When a value of the said derived cost is smaller than a predefined threshold, the optical flow refinement process is not performed. When a value of the derived cost is greater than or equal to the threshold, the optical flow refinement process is performed. If the optical flow refinement process is performed, the samples of final prediction are modified.

In operation 6, according to the output of the operation 5, if the derived cost is greater than the said threshold, the optical flow refinement process is applied to the second predictions, the second predictions are obtained according to MV0' and MV1' (refined motion vectors). The final prediction for the current coding block is obtained by perform optical flow refinement process on the second predictions, the second predictions are pointed by MV0' and MV1'. If the matching cost is smaller than the said threshold, the final prediction is obtained according to second predictions pointed by MV0' and MV1', without the application of optical flow refinement, that's means, Operation 6 is not performed.

According to another implementation, when the optical flow refinement process is not performed, the final prediction is obtained according to the following formula:

$$\text{Bi-prediction} = \text{Prediction1} * W1 + \text{Prediction2} * W2 + K,$$

where W1 and W2 are weighting factors, W1 and W2 might be signaled in a bitstream or might be predefined at encoder side or at decoder side. K is an additive factor which might also be signaled in a bitstream or be predefined at encoder side or at decoder side. In an example, bi-prediction might be obtained using $$\text{Bi-prediction} = (\text{Prediction1} + \text{Prediction2})/2,$$

where W1 and W2 are set to ½ and K is set to 0. Prediction1 and prediction2 are the second predictions that are obtained by K-tap interpolation filtering, Prediction1 corresponds to first refined MV (MV0') and the Prediction2 corresponds to second refined MV (MV1').

The equation above achieves weighted combination of the two predictions, and the result is the final prediction for the block.

The threshold can be a predefined value, a value of the threshold is dependent on the size of the prediction block. For example, the threshold can be thr=nCbW×nCbH×K, where K is a value greater than zero, nCbW and nCbH are width and height of the prediction block.

Figure 7:
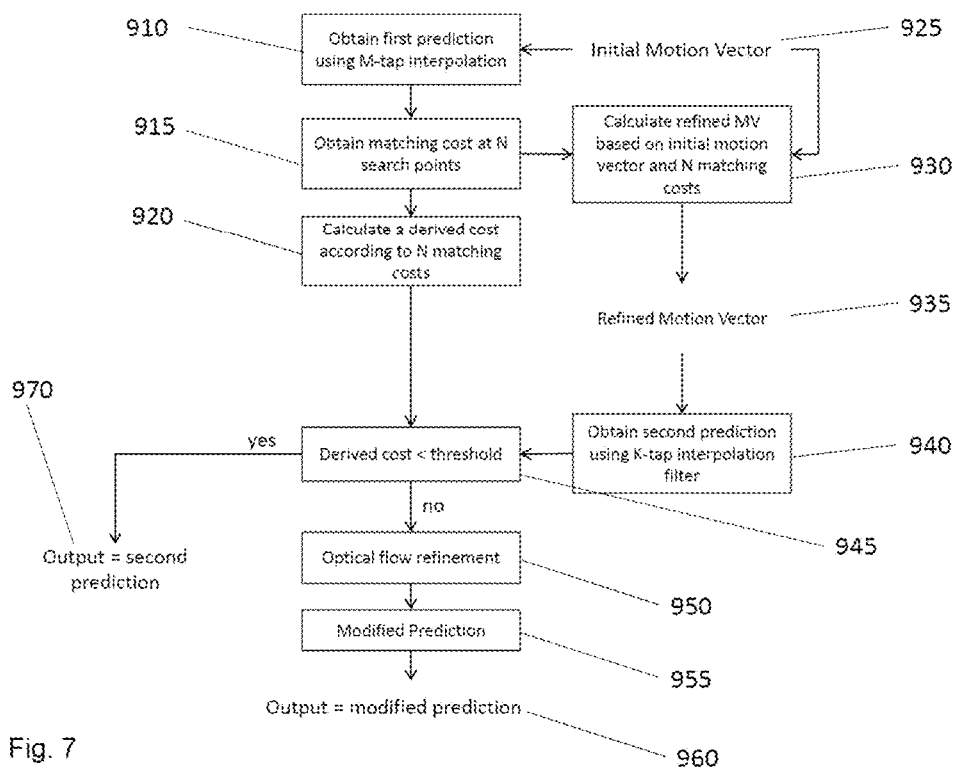
FIG. 7 is a flowchart illustrating another embodiment of optical refinement process.

The second embodiment is further exemplified by the flowchart of in FIG. 7.

In one implementation, the M-tap filter is a 2-tap filter (e.g. bilinear filter) with one of the taps equal to zero. In this implementation, the M-tap filter employs 2 multiplier coefficients, a value of one coefficient is always equal to zero. The coefficient that is equal to zero is determined based on the fractional sample point that is pointed by the motion vector. In this case, a value of the first multiplier coefficient, or a value of the second multiplier coefficient might be zero, depending on the fractional component of the motion vector.

Such a filter (with 2 taps, one of which is zero, can be exemplified according to the following table:

| Fractional sample position p | interpolation filter coefficients | |
| --- | --- | --- |
| | $fb_L[\,p\,][\,0\,]$ | $fb_L[\,p\,][\,1\,]$ |
| 1 | 16 | 0 |
| 2 | 16 | 0 |
| 3 | 16 | 0 |
| 4 | 16 | 0 |
| 5 | 16 | 0 |
| 6 | 16 | 0 |
| 7 | 16 | 0 |
| 8 | 0 | 16 |
| 9 | 0 | 16 |
| 10 | 0 | 16 |
| 11 | 0 | 16 |
| 12 | 0 | 16 |
| 13 | 0 | 16 |
| 14 | 0 | 16 |
| 15 | 0 | 16 |

The fractional sample position (p) can be obtained according to the components of the initial or refined motion vector. For example, if the −x component of the motion vector is given by MV0x, then the fractional sample position can be obtained as p=MV0x %16, where "%" is the modulo operation. In general p=MV0x % K, where K represents the number of fractional sample positions between two sample positions. The interpolation filter exemplified above can also be called 1-tap filter, as only one of the filter taps are non-zero at a time.

Another example of bilinear interpolation filter can be as follows, in which case both of the filter coefficients are non-zero:

| Fractional sample position p | interpolation filter coefficients | |
| --- | --- | --- |
| | $fb_L[\,p\,][\,0\,]$ | $fb_L[\,p\,][\,1\,]$ |
| 1 | 15 | 1 |
| 2 | 14 | 2 |
| 3 | 13 | 3 |
| 4 | 12 | 4 |
| 5 | 11 | 5 |
| 6 | 10 | 6 |
| 7 | 9 | 7 |
| 8 | 8 | 8 |
| 9 | 7 | 9 |
| 10 | 6 | 10 |
| 11 | 5 | 11 |
| 12 | 4 | 12 |

-continued

| Fractional sample position p | interpolation filter coefficients | |
|---|---|---|
| | fb$_L$[ p ][ 0 ] | fb$_L$[ p ][ 1 ] |
| 13 | 3 | 13 |
| 14 | 2 | 14 |
| 15 | 1 | 15 |

In one implementation, a value of the K is equal to 8. In other examples, a value of the M is smaller than 8.

In one implementation, a value of the M and a value of the K are both equal to 8.

In one implementation, the second function can be a function for linearly combining the N matching costs according to dmvOffset, where the dmvOffset have been obtained in operation 3. A linear combination of x and y would be any expression of the form ax+by, where a and b are constants. In an example the constants a and b can be determined based on dmvOffset. Examples for second function are given below.

In one implementation, the second function can be:
Sad[1]*A+Sad[2]*B+Sad[3]*C+Sad[4]*D, where A, B, C and D are greater than or equal to zero. In one example A, B, C and D might be numbers that are between 0 and 1, and which add up to 1 (i.e. A+B+C+D=1). In another example A, B, C and D might be numbers greater than or equal to 0 and which add up to a predefined fixed number P, P might be equal to 1,2, 4, 8, 16 etc.

A, B, C and D might be predefined fixed numbers.

A, B, C and D might be derived according to dmvOffset[0] and dmvOffset[1]. In an example, A=dmvOffset[0], B=P1−dmvOffset[0], C=dmvOffset[1], D=P2−dmvOffset[1]. Where P1 and P2 might be equal to 1, 4, 8,16, etc.

The above equation is given as example. The equation represents linear combination of 4 matching costs to obtain the derived cost. In the equation, the dmvOffset is used, which might be obtained in the operation 3. dmvOffset represents the difference between refined motion vector and the initial motion vector. In one specific implementation the dmvOffset is defined as the difference between MV0 and MV0'. More specifically the dmvOffset[0] might be the difference between the −x component of MV0 and MV0', whereas the dmvOffset[1] might be the difference between the −y component of MV0 and MV0'.

In another implementation, the second function can be:
Sad[1]*A+Sad[2]*B+Sad[3]*C, where A, B and C are greater than or equal to zero. In one example A,B, and C might be numbers that are between 0 and 1, and which add up to 1 (i.e. A+B+C=1). In another example, A, B and C might be numbers greater than or equal to 0 and which add up to a predefined fixed number P, P might be equal to 1, 2, 4, 8, 16 etc.

A, B and C can be predefined fixed numbers.

A, B and C might be derived according to dmvOffset[0] and dmvOffset[1]. In an example, A=P−dmvOffset[0]−dmvOffset[1], B=dmvOffset[0], C=dmvOffset[1]. Where P might be equal to 1, 4, 8, 16, etc.

The above equation is given as example. The equation represents linear combination of 3 matching costs to obtain the derived cost. In the equation the dmvOffset is used, which might be obtained in the operation 3. dmvOffset represents the difference between refined motion vector and the initial motion vector. In one example the dmvOffset is defined as the difference between MV0 and MV0'. More specifically the dmvOffset[0] might be the difference between the −x component of MV0 and MV0', whereas the dmvOffset[1] might be the difference between the −y component of MV0 and MV0'.

In another implementation, the second function to obtain the derived cost can be:

Using 5 evaluated dis-similarity cost values (e.g. SAD values) at refined MV pair and candidate MV pairs that are at integer distance from the refined MV pair, a parametric error surface function $$E(x, y) = A*(x - x_0)^2 + B*(y - y_0)^2 + C$$

Is fitted where ($x_0$, $y_0$) corresponds to the position at which the dis-similarity between the two reference patches is minimized, C is the value of the cost at ($x_0$, $y_0$), and A, B are model coefficients. These 5 unknowns can be solved in an exact manner if 5 cost values are available. In other words, the equation for E(x,y) makes the assumption that the shape of the matching costs as a function of spatial positions near the minimum matching cost position is parabolic in shape.

In one embodiment, the candidate MV pairs to the left, top, right, and bottom of the refined MV pair at one integer pixel distance are used. In this case, given the evaluated values of E(x,y) at (x,y) positions of (0,0), (−1,0), (0,−1), (1,0), and (0,1) and the parametric equation for E(x,y), the 5 unknowns A, B, C, $x_0$, $y_0$ can be solved as follows:

$$A = (E(-1, 0) + E(1, 0) - 2*E(0, 0))/2$$

$$B = (E(0, -1) + E(0, 1) - 2*E(0, 0))/2$$

$$x_0 = (E(-1, 0) - E(1, 0))/(2*(E(-1, 0) + E(1, 0) - 2*E(0, 0)))$$

$$y_0 = (E(0, -1) - E(0, 1))/(2*(E(0, -1) + E(0, 1) - 2*E(0, 0)))$$

$$C = \text{Derived}_{Cost} = E(0, 0) - \frac{(E(-1, 0) - E(1, 0))^2}{8*(E(-1, 0) + E(1, 0) - 2*E(0, 0))} - \frac{(E(0, -1) - E(0, 1))^2}{8*(E(0, -1) + E(0, 1) - 2*E(0, 0))}$$

On the other hand, if cost values at more than 5 positions are available, the 5 unknowns can be solved using a least squares or similar approach. The obtained value of C then becomes the derived cost.

In one implementation the second function can be as follows:

$$\text{Derived}_{Cost} = \text{SAD}[0] - \frac{(\text{SAD}[1] - \text{SAD}[2])^2}{K*(\text{SAD}[1] + \text{SAD}[2] - 2*\text{SAD}[0])} - \frac{(\text{SAD}[3] - \text{SAD}[4])^2}{K*(\text{SAD}[3] + \text{SAD}[4] - 2*\text{SAD}[0])}$$

Where K is a scalar greater than 0 and sad[0] to sad[4] are the N matching costs.

In one example, the motion vector refinement process is performed more than once to refine the motion vector further. In this example, initial motion vectors are first refined by the motion vector refinement process, to obtain the first refined motion vector. Afterwards, motion vector refinement is performed one more time, in this case the first refined motion vector is considered as the initial motion vectors for the second motion vector refinement.

The initial motion vector is obtained in 925, which is the input of the motion vector refinement unit. A search space is constructed around the initial motion vector by the motion vector refinement unit (930). In one example the search space consists of candidate motion vectors pairs, first motion vector of the pair corresponding to first reference picture and the second motion vector of the pair corresponding to second reference picture. First predictions corresponding to each candidate motion vector pairs are obtained in operation 910, by application of M-tap interpolation filter. As part of motion vector refinement, a matching cost is calculated corresponding to N motion vector pairs in the search space (915). The said N matching costs are used as part of two processes, the first process is motion vector refinement (930), where the matching costs are used to calculate the refined motion vector pair (935) according to a function that takes the N matching costs as input. The second process is the decision of whether the optical flow refinement (950) is applied or not, where the decision is taken by 945. After the refined motion vector is obtained, second prediction for the current block is obtained by (940). If the matching cost is greater than a threshold, optical flow refinement is applied and the prediction in 940 is modified by 950 to obtain the modified prediction (955-960). Modified prediction is typically different in sample values from the second prediction in operation 940. If the matching cost is smaller than a threshold, optical flow refinement is not applied and the second prediction is set as output (the final prediction of the current block).

According to a third exemplary embodiment of the present disclosure, the following operations are applied in order to obtain the prediction for a current coding block:

Operation 0: obtain initial motion vector pair based on an indication information in a bitstream.

Operation 1: obtain a first set of predicted samples based on the initial MV pair and a M-tap interpolation filter.

Operation 2: obtain a first matching cost corresponding to the initial MV pair using the first set of predicted samples Operation 3: determine whether the current coding block is eligible to perform motion vector refinement.

Operation 4: If the current coding block is determined to be eligible to perform MVR in operation 3, Operation 4a: obtain a refined MV pair and a matching cost corresponding to the refined MV pair according to the initial MV pair and the matching cost using a motion vector refinement process.

Operation 4b: obtain a second set of predicted samples according to the refined MV pair and a K-tap interpolation filter.

Operation 4c: determine whether to perform an optical flow refinement process according to the second matching cost. In an example, the matching cost is compared with a threshold, and optical flow refinement process is performed when a value of the matching cost is greater than or equal to the threshold.

Operation 5: Otherwise (if the current coding block is determined to be not eligible to perform MVR in operation 3), Operation 5a: obtain a second set of predicted samples according to the initial MV pair and a K-tap interpolation filter Operation 5b: determine whether to perform an optical flow refinement process according to the first matching cost. In an example, the matching cost is compared with a threshold, and optical flow refinement process is performed when a value of the matching cost is greater than or equal to the threshold.

Operation 6: When it's determined that the optical flow refinement process need to be performed (either in operation 4c or operation 5b), optical flow refinement is applied with the second prediction as input and modified second prediction as output. If determined negatively, the optical flow refinement is not applied on the second prediction. In other words, when it's determined that the optical flow refinement process need to be performed, the final prediction of the current coding block is obtained according to second prediction and according to optical flow refinement process. Otherwise the final prediction of the current coding block is obtained according to second prediction and without application of optical flow refinement process.

Figure 9:
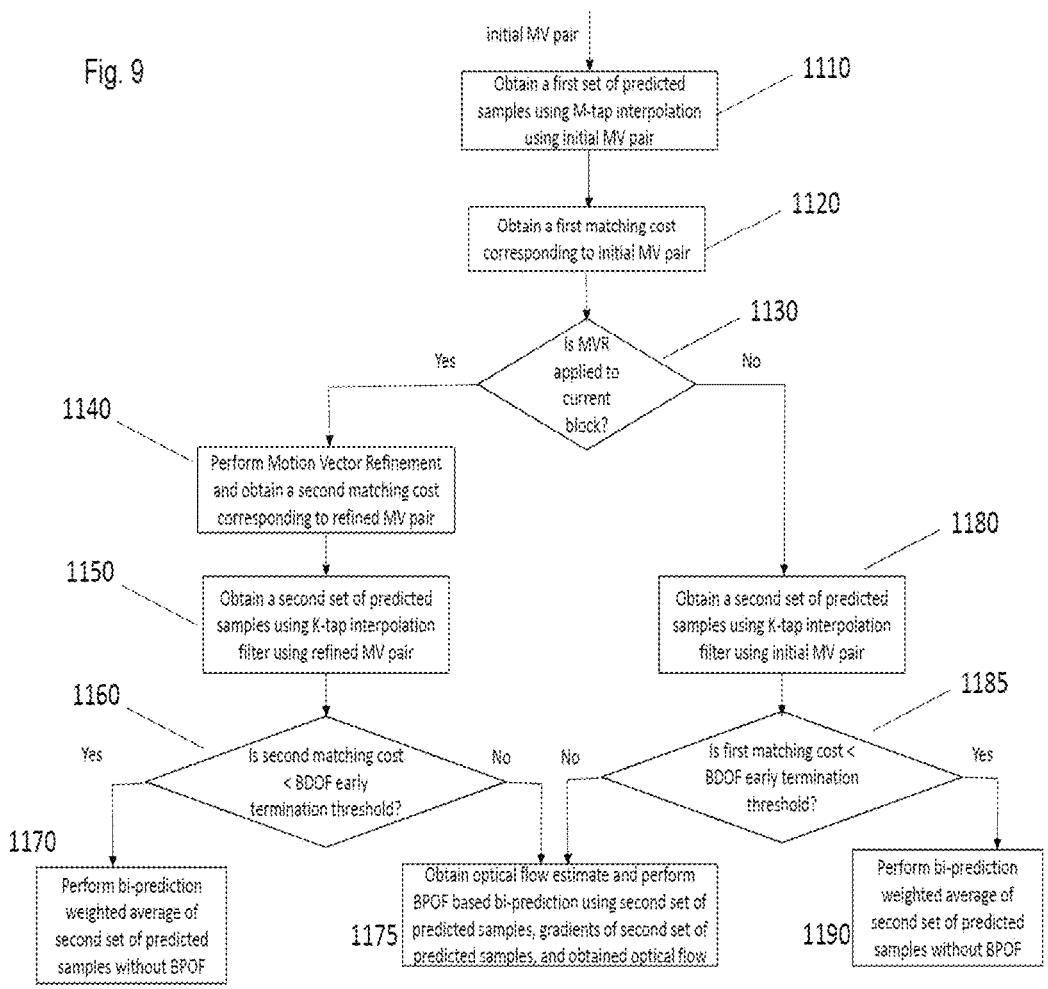
FIG. 9 is a flowchart illustrating another embodiment of optical refinement process.

This embodiment is further illustrated in the flow chart in FIG. 9. Block 1110 receives an initial MV pair for a current coding block for prediction in references L0 and L1. Block 1110 corresponds to operation 1, wherein a first set of predicted samples are obtained using the initial MV pair and reconstructed reference samples of pictures L0 and L1. Block 1120 corresponds to operation 2, wherein a first matching cost (or dis-similarity metric such as SAD) is evaluated between the first set of predicted block of samples corresponding to the initial MV pair (as described in the background MVR section). Block 1130 corresponds to operation 3, wherein the conditions for eligibility of the current coding block to perform MVR are checked. Block 1140 corresponds to operation 4a, wherein if the current coding block is found to be eligible to perform MVR, a refined MV pair is obtained by performing MVR (as described in the background MVR section) and a second matching cost (or dis-similarity metric) corresponding to the refined MV pair is obtained. Block 1150 corresponds to operation 4b, wherein a second set of predicted samples are obtained using a K-tap interpolation filter (in the horizontal and vertical directions) using the refined MV pair. Block 1160 corresponds to operation 4c, wherein it is checked whether the second matching cost is less than a pre-determined threshold below which bi-predictive optical flow based refinement and bi-prediction is skipped. Block 1180 corresponds to operation 5a, wherein the current coding block skips MVR and obtains a second set of predicted samples using a K-tap interpolation filter using the initial MV pair. Block 1185 corresponds to operation 5b, wherein it is checked whether the first matching cost is less than the pre-determined threshold below which BPOF is skipped. Blocks 1170 and 1195 correspond to a part of operation 6, wherein if the check in operation 4c or operation 5b indicates that the second or first matching cost respectively is less than the pre-determined threshold below which BPOF is skipped, a bi-prediction weighted averaging without BPOF is performed using the second set of predicted samples. Block 1175 corresponds to a part of operation 6, wherein if the check in operation 4c or operation 5b indicate that the second or first matching cost is not less than the pre-determined threshold below which BPOF is skipped, optical flow estimated is obtained and the final bi-prediction is obtained using the second set of predicted samples, gradients of the second set of predicted samples, and the estimated optical flow.

It should be noted that by using the first or second matching cost that are computed on a sub-block of samples within a current coding unit as required by the motion vector refinement process for determining early termination of bi-predictive optical flow based refinement process, the decision to skip or perform BPOF can vary from one MVR sub-block to another within a coding unit. BPOF shall either be applied or skipped for all BPOF application units (e.g. pixel level, or 4×4 block of samples level) within a sub-block based on the determination performed in operation-4c or operation-5.

In certain embodiments, it is possible to perform additional early termination for each BPOF application unit within a sub-block by obtaining partial matching costs corresponding to each BPOF application unit within an MVR sub-block.

The pre-determined threshold value is typically chosen as a per-sample threshold value that depends on the bit-depth of the first prediction or first set of predicted samples. For instance, if the first prediction sample value obtained using a bilinear (2-tap) interpolation is constrained to be at bit-depth b, the per-sample threshold is computed to be $k*2^{(b-10)}$, and the number of samples for which the matching cost is computed is N, then the pre-determined threshold value against which the matching cost for current sub-block is compared shall be $k*N*2^{(10-b)}$. Sample values for k are 2 (for a bit-depth of 10), N is 8×16=128, and b is 8. Since the matching cost at a given candidate MV pair can be computed with a decimated set of first predicted samples, the value of N should be used accordingly. For example, if alternate rows of a 8×16 block of predicted samples is used, N shall be computed as 8×8=64.

According to embodiments of the disclosure, an early termination method is provided in order to conditionally skip an application of optical flow refinement process, the application of optical flow refinement process is considered to be computationally intensive. As a result, the average decoding time is reduced.

Additionally, the condition for conditionally skipping the application of optical flow is determined based on parameters that are calculated by another process (calculating matching costs in the course of a motion vector refinement process). Since already calculated values are used, no additional computations need to be performed.

Figure 10:
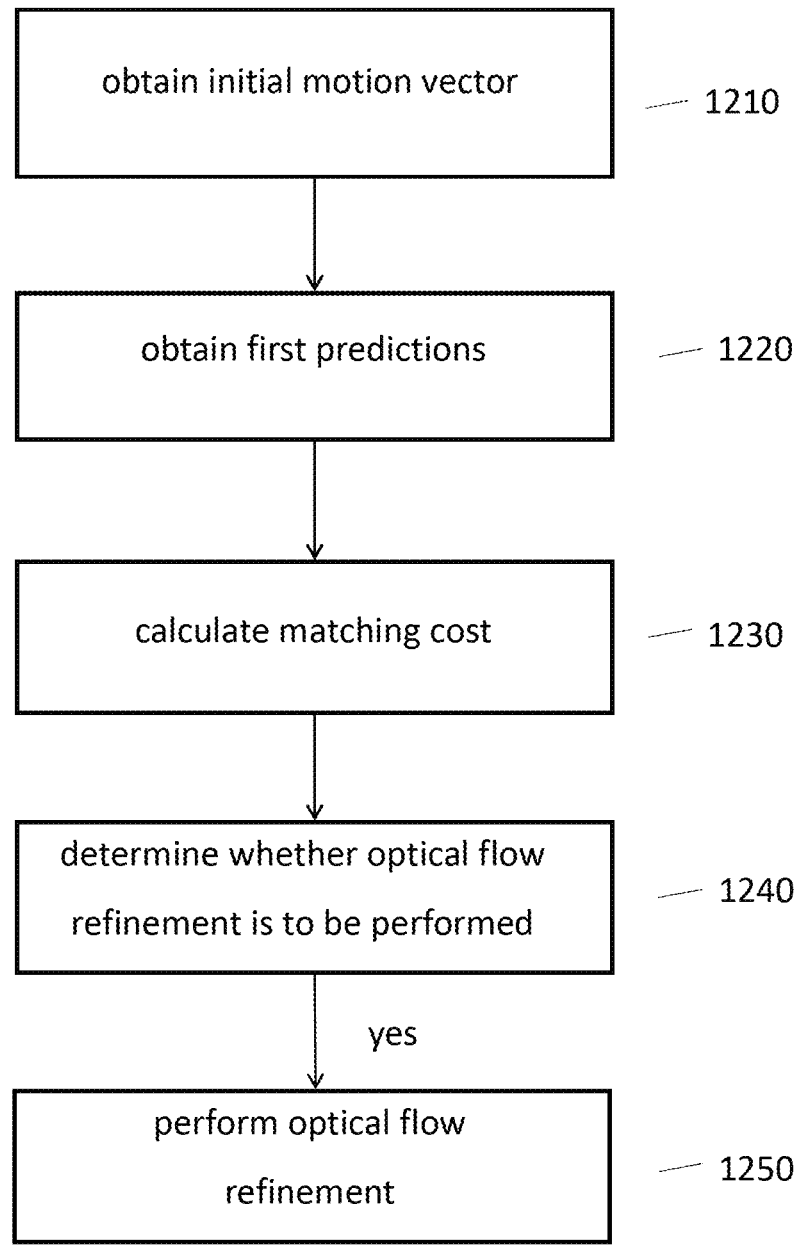
FIG. 10 is a flowchart illustrating a method of video coding implemented in a decoding device or an encoding device according to an embodiment of the present disclosure.

In particular, it is provided a method of video coding implemented in a decoding device or an encoding device as illustrated in FIG. 10. The method comprises the following operations that may be performed in the given order. An initial motion vector is obtained for a current block 1210. The current block may be a current coding block. First predictions for a sample value in the current block are obtained based on the initial motion vectors 1220. A matching cost is calculated according to the first predictions 1230.

After the first matching cost is obtained it is determined whether an optical flow refinement process should be performed or not 1240, according to at least one preset condition, the at least one preset condition comprising a condition of whether the calculated matching cost (for example, in terms of a similarity measure; see description above) is equal to or larger than a predefined threshold. An optical flow refinement process for obtaining a final inter prediction for the sample value in the current block is performed 1250, when it is determined that the optical flow refinement process should be performed. When it is determined that the optical flow refinement process should not be performed computational costs can be saved by skipping the optical flow refinement process.

This method can be implemented in the apparatuses described above with reference to FIGS. 1a to 5.

In particular, the method can be implemented in the context of a decoder side motion vector refinement process. Inputs of such a process are:

a luma location (xSb, ySb) specifying the top-left sample of the current coding subblock relative to the top-left luma sample of the current picture, a variable sbWidth specifying the width of the current coding subblock in luma samples, a variable sbHeight specifying the height of the current coding subblock in luma samples, the luma motion vectors in 1/16 fractional-sample accuracy mvL0 and mvL1, the selected luma reference picture sample arrays refPicL0$_L$, and refPicL1$_L$.

Outputs of this process are: the delta luma motion vectors dMvL0 and dMvL and a variable dmvrSad specifying the minimum sum of absolute differences of first predictions (cf. SAD calculation described above).

The delta luma motion vector dMvL0 may be derived by dMvL0[0]+=16*intOffX and dMvL0[1]+=16*intOffY, where intOffX and intOffY are the integer sample offsets in the x and y direction, respectively. Further, the delta luma motion vector dMvL may be calculated as dMvL1[0]=−dMvL0[0] and dMvL1[1]=−dMvL0[1].

First prediction luma sample values are derived by fractional sample bilinear interpolation. In the decoding process of inter predicted blocks a bidirectional optical flow sample prediction process may or may not be applied. If it is not applied a weighted sample prediction process is applied to refined second predictions obtained based on refined motion vectors. If the bidirectional optical flow sample prediction process is applied, it receives second predictions obtained based on refined motion vectors as in input and outputs final predictions.

A flag may be used to signal whether or not the bidirectional optical flow sample prediction process can be applied. For example, it may be considered a necessary condition for the bidirectional optical flow sample prediction process to be carried out that the flag is TRUE. However, this necessary condition may not be a sufficient condition for the bidirectional optical flow sample prediction process to be carried out. A sufficient condition may by that both the flag is TRUE and the above-described matching cost is equal to or larger than a predefined threshold. For example, the matching cost can be determined based on the variable dmvrSad specifying the minimum sum of absolute differences of first predictions.

On the other hand, it may be considered a sufficient condition for not carrying out the optical flow sample prediction process but carrying out the weighted sample prediction process if the flag is FALSE.

Figure 11:
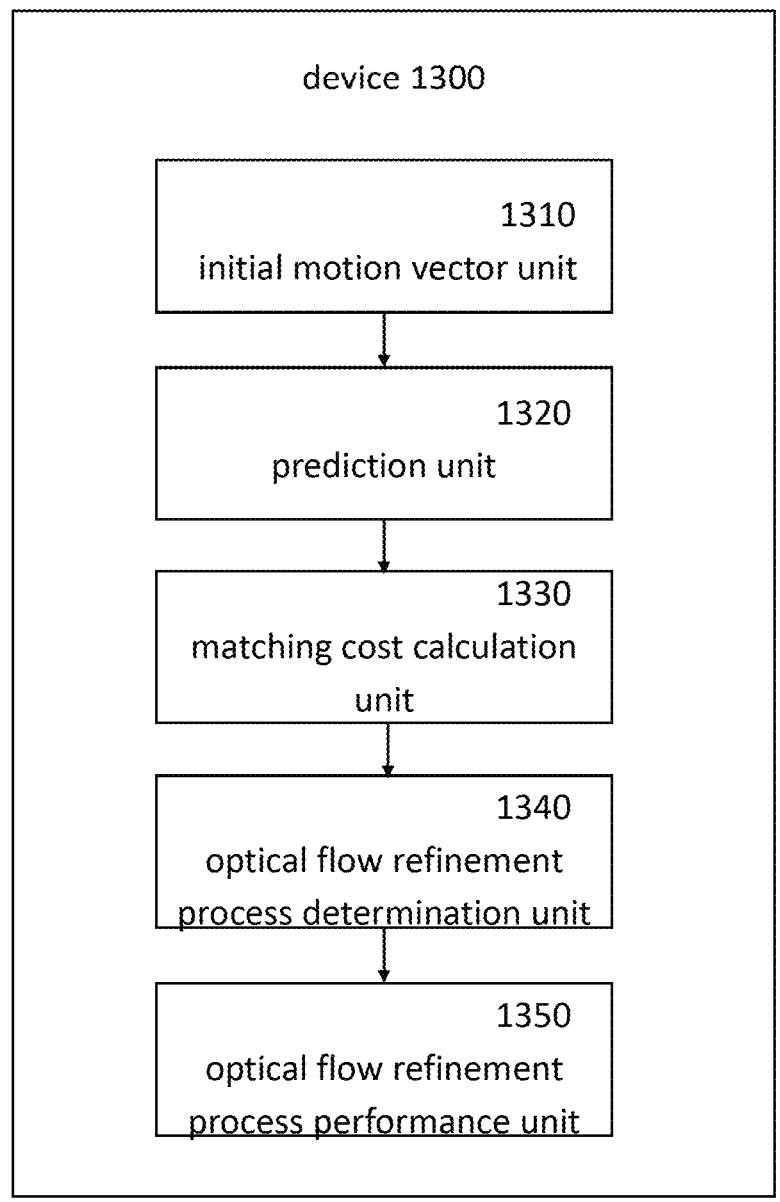
FIG. 11 illustrates a device for use in an image encoder and/or an image decoder according to an embodiment of the present disclosure.

Furthermore, it is provided a device 1300 for use in an image encoder and/or an image decoder as illustrated in FIG. 11. The device 1300, according to this exemplary embodiment, comprises an initial motion vector unit 1310 that is configured for obtaining initial motion vectors for a current block. Moreover, the device 1300 comprises a prediction unit 1320 that is configured for obtaining first predictions for a sample value in the current block based on the initial motion vectors. Further, the device 1300 comprises a matching cost calculation unit 1330 that is configured for calculating a matching cost according to the first predictions.

The device 1300 comprises an optical flow refinement process determination unit 1340 that is configured for determining whether an optical flow refinement process should be performed or not, according to at least one preset condition, the at least one preset condition comprising a condition of whether the calculated matching cost is equal to or larger than a threshold. Further, the device 1300 comprises an optical flow refinement process performance unit 1350 that is configured for performing an optical flow refinement process for obtaining a final inter prediction for the sample value in the current block, when it is determined that the optical flow refinement process should be performed.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:
+ Addition
− Subtraction (as a two-argument operator) or negation (as a unary prefix operator)
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.
x/y Used to denote division in mathematical equations where no truncation or rounding is intended.

$$\sum_{i=x}^{y} f(i)$$

The summation of f(i) with i taking all integer values from x up to and including y.
x % y Modulus. Remainder of x divided by y, defined only for integers x and y with x>=0 and y>0.

Logical Operators

The following logical operators are defined as follows:
x && y Boolean logical "and" of x and y
x||y Boolean logical "or" of x and y
! Boolean logical "not"
x?y:z If x is TRUE or not equal to 0, evaluates to the value of y; otherwise, evaluates to the value of z.

Relational Operators

The following relational operators are defined as follows:
> Greater than
>= Greater than or equal to
< Less than
<= Less than or equal to
== Equal to
!= Not equal to When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:
& Bit-wise "and". When operating on integer arguments, operates on a two's complement representation of the integer value. When operating on a binary argument that contains fewer bits than another argument, the shorter argument is extended by adding more significant bits equal to 0.

| Bit-wise "or". When operating on integer arguments, operates on a two's complement representation of the integer value. When operating on a binary argument that contains fewer bits than another argument, the shorter argument is extended by adding more significant bits equal to 0.

^ Bit-wise "exclusive or". When operating on integer arguments, operates on a two's complement representation of the integer value. When operating on a binary argument that contains fewer bits than another argument, the shorter argument is extended by adding more significant bits equal to 0.

x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:
= Assignment operator
++ Increment, i.e., x++ is equivalent to x=x+1; when used in an array index, evaluates to the value of the variable prior to the increment operation.
−− Decrement, i.e., x−− is equivalent to x=x−1; when used in an array index, evaluates to the value of the variable prior to the decrement operation.
+= Increment by amount specified, i.e., x+=3 is equivalent to x=x+3, and x+=(−3) is equivalent to x=x+(−3).
−= Decrement by amount specified, i.e., x−=3 is equivalent to x=x−3, and x−=(−3) is equivalent to x=x−('3).

Range Notation

The following notation is used to specify a range of values:
x=y . . . z x takes on integer values starting from y to z, inclusive, with x, y, and z being integer numbers and z being greater than y.

Mathematical Functions

The following mathematical functions are defined:

$$\mathrm{Abs}(x) = \begin{cases} x & ; \ x >= 0 \\ -x & ; \ x < 0 \end{cases}$$

Asin(x) the trigonometric inverse sine function, operating on an argument x that is in the range of −1.0 to 1.0, inclusive, with an output value in the range of −π÷2 to π÷2, inclusive, in units of radians Atan(x) the trigonometric inverse tangent function, operating on an argument x, with an output value in the range of −π÷2 to π÷2, inclusive, in units of radians $$\text{Atan2}(y, x) = \begin{cases} \text{Atan}\left(\frac{y}{x}\right) & ; \quad x > 0 \\ \text{Atan}\left(\frac{y}{x}\right) + \pi & ; \quad x < 0 \ \&\&\ y >= 0 \\ \text{Atan}\left(\frac{y}{x}\right) - \pi & ; \quad x < 0 \ \&\&\ y < 0 \\ +\frac{\pi}{2} & ; \quad x == 0 \ \&\&\ y >= 0 \\ -\frac{\pi}{2} & ; \quad \text{otherwise} \end{cases}$$

Ceil(x) the smallest integer greater than or equal to x.

$$\text{Clip1}_Y(x) = \text{Clip3}(0, (1 << \text{BitDepth}_Y) - 1, x)$$

$$\text{Clip1}_C(x) = \text{Clip3}(0, (1 << \text{BitDepth}_C) - 1, x)$$

$$\text{Clip3}(x, y, z) = \begin{cases} x & ; \quad z < x \\ y & ; \quad z > y \\ z & ; \quad \text{otherwise} \end{cases}$$

Cos(x) the trigonometric cosine function operating on an argument x in units of radians.

Floor(x) the largest integer less than or equal to x.

$$\text{GetCurrMsb}(a, b, c, d) = \begin{cases} c + d & ; \quad b - a >= d/2 \\ c - d & ; \quad a - b > d/2 \\ c & ; \quad \text{otherwise} \end{cases}$$

Ln(x) the natural logarithm of x (the base-e logarithm, where e is the natural logarithm base constant 2.718 281 828 . . . ).

Log 2(x) the base-2 logarithm of x.

Log 10(x) the base-10 logarithm of x.

$$\text{Min}(x, y) = \begin{cases} x & ; \quad x <= y \\ y & ; \quad x > y \end{cases}$$

$$\text{Max}(x, y) = \begin{cases} x & ; \quad x >= y \\ y & ; \quad x < y \end{cases}$$

$$\text{Round}(x) = \text{Sign}(x) * \text{Floor}(\text{Abs}(x) + 0.5)$$

$$\text{Sign}(x) = \begin{cases} 1 & ; \quad x > 0 \\ 0 & ; \quad x == 0 \\ -1 & ; \quad x < 0 \end{cases}$$

Sin(x) the trigonometric sine function operating on an argument x in units of radians $$\text{Sqrt}(x) = \sqrt{x}$$

$$\text{Swap}(x, y) = (y, x)$$

Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

Table: Operation Precedence from Highest (At Top of Table) to Lowest (At Bottom of Table)

---
operations (with operands x, y, and z)

"x++", "x− −"

"!x", "−x" (as a unary prefix operator)

$x^y$

"x * y", "x/y", "x ÷ y", "$\frac{x}{y}$", "x % y"

"x + y", "x − y" (as a two-argument operator), "

$$\sum_{i=x}^{y} f(i)"$$

"x << y", "x >> y"

"x < y", "x <= y", "x > y", "x >= y"

"x == y", "x != y"

"x & y"

"x | y"

"x && y"

"x || y"

"x ? y:z"

"x . . . y"

"x = y", "x += y", "x −= y"

---

Text Description of Logical Operations

In the text, a statement of logical operations as would be described mathematically in the following form:

---
```
if( condition 0 )
    statement 0
else if( condition 1 )
    statement 1
...
else /* informative remark on remaining condition
    statement n
```
--- may be described in the following manner:

. . . as follows / . . . the following applies:

If condition 0, statement 0

Otherwise, if condition 1, statement 1

. . .

Otherwise (informative remark on remaining condition), statement n

Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . " statements can be identified by matching " . . . as follows" or " . . . the following applies" with the ending "Otherwise, . . . ".

In the text, a statement of logical operations as would be described mathematically in the following form:

---
```
if( condition 0a && condition 0b )
    statement 0
else if( condition 1a || condition 1b )
    statement 1
...
else
    statement n
```
--- may be described in the following manner:
... as follows / ... the following applies:
If all of the following conditions are true, statement 0:
  condition 0a
  condition 0b
Otherwise, if one or more of the following conditions are true, statement 1:
  condition 1a
  condition 1b
...
Otherwise, statement n In the text, a statement of logical operations as would be described mathematically in the following form:

```
if( condition 0 )
   statement 0
if( condition 1 )
   statement 1
``` may be described in the following manner:
When condition 0, statement 0
When condition 1, statement 1

Although embodiments of the disclosure have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The invention claimed is:
1. A method of video coding implemented in a decoding device, the method comprising:
  obtaining a pair of initial motion vectors for a current block, wherein the current block is a sub-block;
  obtaining two first prediction blocks for the current block based on the pair of initial motion vectors;
  calculating a first matching cost according to the two first prediction blocks, wherein the first matching cost is a sum of absolute differences (SAD) between the two first prediction blocks;
  obtaining a pair of refined motion vectors based on the pair of initial motion vectors;
  obtaining two second prediction blocks for the current block according to the pair of refined motion vectors;
  obtaining a second matching cost corresponding to the two second prediction blocks;
  determining whether an optical flow refinement process is to be performed or not, according to at least one preset condition, the at least one preset condition comprising a condition of whether the second matching cost is less than a threshold;

performing an optical flow refinement process on the two second prediction blocks for obtaining a final prediction block for the current block, when it is determined that the optical flow refinement process is to be performed;

obtaining the final prediction block by a weighted sum of the two second prediction blocks when it is determined that the optical flow refinement process is not to be performed;

obtaining a reconstructed residual block; and adding the reconstructed residual block to the final prediction block to obtain a reconstructed block of the current block.

2. The method of claim 1, further comprising:
determining whether the current block is eligible to perform motion vector refinement (MVR);
if the current block is determined to be eligible to perform MVR, obtaining the pair of refined motion vectors based on the pair of initial motion vectors.

3. The method of claim 1, wherein the at least one preset condition comprises the condition that the current block is allowed to be predicted by decoder-side motion vector refinement.

4. The method of claim 1, wherein it is determined that the optical flow refinement process is to be performed, when it is determined that all of the at least one preset condition is fulfilled.

5. The method of claim 1, wherein the two first prediction blocks for the current block are obtained based on a bilinear interpolation filter.

6. The method of claim 1, wherein the two second prediction blocks for the current block are obtained according to an 8-tap interpolation filter.

7. The method of claim 1, wherein when the second matching cost is not less than a threshold value, it is determined that the optical flow refinement process is to be performed.

8. The method of claim 1, wherein a threshold value is obtained according to a size of the current block.

9. A decoder, comprising: a memory configured to store instructions; and
a processor coupled to the memory, wherein the instructions when executed cause the processor to be configured for:
obtaining a pair of initial motion vectors for a current block, wherein the current block is a sub-block;
obtaining two first prediction blocks for the current block based on the pair of initial motion vectors;
calculating a first matching cost according to the two first prediction blocks, wherein the first matching cost is a sum of absolute differences (SAD) between the two first prediction blocks;
obtaining a pair of refined motion vectors based on the pair of initial motion vectors;
obtaining two second prediction blocks for the current block according to the pair of refined motion vectors;
obtaining a second matching cost corresponding to the two second prediction blocks;
determining whether an optical flow refinement process is to be performed or not, according to at least one preset condition, the at least one preset condition comprising a condition of whether the second matching cost is less than a threshold;

performing an optical flow refinement process on the two second prediction blocks for obtaining a final prediction block for the current block, when it is determined that the optical flow refinement process is to be performed;

obtaining the final prediction block by a weighted sum of the two second prediction blocks when it is determined that the optical flow refinement process is not to be performed;

obtaining a reconstructed residual block;

adding the reconstructed residual block to the final prediction block to obtain a reconstructed block of the current block.

10. The decoder of claim 9, wherein the instructions further cause the processor to be configured for:
determining whether the current block is eligible to perform motion vector refinement (MVR);
if the current block is determined to be eligible to perform MVR, obtaining the pair of refined motion vectors based on the pair of initial motion vectors.

11. The decoder of claim 9, wherein the at least one preset condition comprises the condition that the current block is allowed to be predicted by decoder-side motion vector refinement.

12. The decoder of claim 9, wherein it is determined that the optical flow refinement process is to be performed, when it is determined that all of the at least one preset condition is fulfilled.

13. The decoder of claim 9, wherein the two first prediction blocks for the current block are obtained based on a bilinear interpolation filter.

14. The decoder of claim 9, wherein the two second prediction blocks for the current block are obtained according to an 8-tap interpolation filter.

15. The decoder of claim 9, wherein when the second matching cost is not less than a threshold value, it is determined that the optical flow refinement process is to be performed.

16. The decoder of claim 9, wherein a threshold value is obtained according to a size of the current block.

17. A non-transitory computer-readable storage medium having instructions and an encoded bitstream stored therein, wherein the encoded bitstream is obtained by performing an encoding process on picture data, and the encoded bitstream comprises encoded picture data, which when the instructions executed by a processor, cause the processor to perform the encoding process, the encoding process comprising:
obtaining a pair of initial motion vectors for a current block, wherein the current block is a sub-block;
obtaining two first prediction blocks for the current block based on the pair of initial motion vectors;
calculating a first matching cost according to the two first prediction blocks, wherein the first matching cost is a sum of absolute differences (SAD) between the two first prediction blocks;
obtaining a pair of refined motion vectors based on the pair of initial motion vectors;
obtaining two second prediction blocks for the current block according to the pair of refined motion vectors;
obtaining a second matching cost corresponding to the two second prediction blocks;
determining whether an optical flow refinement process is to be performed or not, according to at least one preset condition, the at least one preset condition comprising a condition of whether the second matching cost is less than a threshold;

performing an optical flow refinement process on the two second prediction blocks for obtaining a final prediction block for the current block, when it is determined that the optical flow refinement process is to be performed;

obtaining the final prediction block by a weighted sum of the two second prediction blocks when it is determined that the optical flow refinement process is not to be performed;

obtaining a reconstructed residual block;

adding the reconstructed residual block to the final prediction block to obtain a reconstructed block of the current block.

18. The non-transitory computer-readable storage medium of claim 17, wherein the encoding process further comprise:

determining whether the current block is eligible to perform motion vector refinement (MVR);

if the current block is determined to be eligible to perform MVR, obtaining the pair of refined motion vectors based on the pair of initial motion vectors.

19. The non-transitory computer-readable storage medium of claim 17, wherein when the second matching cost is not less than a threshold value, it is determined that the optical flow refinement process is to be performed.

20. The non-transitory computer-readable storage medium of claim 17, wherein a threshold value is obtained according to a size of the current block.

* * * * *